(12) United States Patent
Glasso

(10) Patent No.: US 12,061,409 B2
(45) Date of Patent: Aug. 13, 2024

(54) LOCKING CAP FOR A CAMERA LENS

(71) Applicant: Patrick J. Glasso, Hollywood, FL (US)

(72) Inventor: Patrick J. Glasso, Hollywood, FL (US)

(*) Notice: Subject to any disclaimer, the term of this patent is extended or adjusted under 35 U.S.C. 154(b) by 0 days.

(21) Appl. No.: 18/194,592

(22) Filed: Mar. 31, 2023

(65) Prior Publication Data
US 2023/0314907 A1  Oct. 5, 2023

Related U.S. Application Data

(60) Provisional application No. 63/362,333, filed on Mar. 31, 2022.

(51) Int. Cl.
  *G03B 11/04* (2021.01)
  *G03B 17/56* (2021.01)

(52) U.S. Cl.
  CPC ............ *G03B 11/041* (2013.01); *G03B 17/56* (2013.01)

(58) Field of Classification Search
  CPC ........ G03B 11/041; G03B 17/56; G02B 7/02; G02B 7/06; Y10T 70/5566
  See application file for complete search history.

(56) References Cited

U.S. PATENT DOCUMENTS

| | | | | |
|---|---|---|---|---|
| 7,961,099 B2* | 6/2011 | Rendon | ............... | E05B 73/0041 |
| | | | | D8/332 |
| 10,302,394 B2* | 5/2019 | Ding | ......................... | F41G 1/38 |
| 2012/0240641 A1* | 9/2012 | Fong | ....................... | G03B 11/04 |
| | | | | 70/58 |
| 2017/0352986 A1* | 12/2017 | Leroyer | ............. | H01R 13/6275 |

FOREIGN PATENT DOCUMENTS

| | | | | | |
|---|---|---|---|---|---|
| CN | 104834073 A | * | 8/2015 | ............. | F41G 1/383 |
| CN | 111258020 A | * | 6/2020 | ............. | F16B 2/065 |
| CN | 210839738 U | * | 6/2020 | | |
| GB | 2591827 A | * | 8/2021 | ............... | G02B 7/02 |

\* cited by examiner

*Primary Examiner* — Christopher E Mahoney
(74) *Attorney, Agent, or Firm* — Nolan IP Law; Jason M. Nolan

(57) ABSTRACT

A locking cap and automated locking cap for coupling to a rear mounting key of a camera lens are disclosed. The locking cap can include a base cap, locking ring, spring ring, shim ring, and top ring. The locking ring includes a locking mechanism and tab for activating the locking mechanism. The tab allows a user to rotatably slide the locking ring to activate or deactivate the locking mechanism. The automated locking cap can include a circuit board and actuating device in communication with the circuit board, which is programmed to receive signals from a user and to transmit the signals to the actuating device. The actuating device includes a retractable pin that inserts into and retracts from a through-hole the top ring, the spring ring, and the locking ring upon receiving the respective signal from the user, which allows the user to activate or deactivate the locking mechanism.

20 Claims, 15 Drawing Sheets

LOCKING CAP FOR A CAMERA LENS

CROSS-REFERENCE TO RELATED APPLICATIONS

This application claims the benefit of priority under 35 U.S.C. § 119(e) of U.S. Provisional Application Ser. No. 63/362,333 filed on Mar. 31, 2022, the content of which is relied upon and incorporated herein by reference in its entirety.

FIELD

The present disclosure generally relates to a locking cap for a camera lens used to record photography and/or motion pictures; and more particularly, to a locking cap that prevents access to the rear mounting key of a camera lens.

BACKGROUND

Existing camera lens caps function only as protective dust covers, and nothing precludes unauthorized access to a camera lens. Camera lenses worth millions of dollars are stolen each year. For at least these reasons, there remains a need for a device that can secure a camera lens from unauthorized access.

SUMMARY

In various embodiments, a locking cap for coupling to a rear mounting key of a camera lens is provided. The locking cap can comprise a base cap, a locking ring, a spring ring, and a top ring; wherein the locking ring is positioned between the base cap and the spring ring; and wherein the spring ring is positioned between the locking ring and the top ring; the base cap comprising a cylindrical sidewall, a flange coupled to a first end of the sidewall, and a closed crown coupled to a second end of the sidewall; wherein the flange comprises a first face comprising a rim and a tray, the tray projecting laterally outward form the first end of the sidewall to the rim, the rim projecting longitudinally upward from the tray, having a depressed height relative to the rim; and a second face comprising a plurality of cogs configured to couple to the rear mounting key of the camera lens; wherein the flange and the top ring combine to enclose the locking ring and the spring ring; the locking ring comprising a post projecting longitudinally upward from a first face of the locking ring through a through-hole in the spring ring, a tab projecting laterally outward from a sidewall of the locking ring, and a locking mechanism comprising a pair of ramps separated by a through-hole and a pin having a head on the first face of the locking ring and a shaft extending through the through-hole of the locking mechanism into an opening configured to receive the pin in the tray of the flange; wherein the flange further comprises a recess in the rim for the receiving the tab of the locking ring, the recess defined by a first endwall and a second endwall opposite the first endwall, wherein the tab of the locking ring rotatably slides laterally between a first and second endwalls, whereby the locking mechanism is activated when the tab is in contact with the first endwall and deactivated when the tab is in contact with the second endwall; and wherein the locking cap can be removed from the rear mounting key of the camera lens when the locking mechanism is deactivated.

In some embodiments, the locking cap further comprises a shim ring positioned between the spring ring and the top ring, wherein the flange and the top ring combine to enclose the locking ring, the spring ring, and the shim ring.

In some embodiments, the pair of ramps are a stepped ramp and a beveled ramp, respectively, and wherein the stepped ramp and the beveled ramp are oriented and inclined in the same direction about the lateral and longitudinal axes.

In some embodiments, the pin is inserted through the locking mechanism near a highest point of the inclined ramps when the lock is not activated, and wherein the pin is inserted through the locking mechanism near a lowest point of the inclined ramps when the lock is activated.

In some embodiments, the spring ring comprises a through-hole configured to receive the post projecting upward from the top surface of the locking ring, which aligns the locking ring and the spring ring with one another such that the locking ring and the spring ring will simultaneously rotate about the base cap.

In some embodiments, the spring ring comprises a biasing member laterally positioned between an exterior diameter and an internal diameter of the spring ring, the biasing member comprising a first end that is connected to and a part of the spring ring, and a second end, opposite the first end, that is not connected to the spring ring.

In some embodiments, the second end of the biasing member comprises a spring post projecting longitudinally upward toward and biased downward by the shim ring, wherein when the locking mechanism is activated, the spring post is forced downward and the biasing member is pressed against the pin in the locking mechanism, which causes a shaft of the pin to be inserted into the opening in the tray of the flange.

In some embodiments, the respective cogs of the plurality of cogs are equally spaced apart from one another, and wherein the respective cogs and corresponding spaces therebetween are configured for coupling with the rear mounting key of the camera lens.

In various embodiments, an automated locking cap for coupling to a rear mounting key of a camera lens is provided. The automated locking cap can comprise a base cap, a locking ring, a spring ring, and a top ring; wherein the locking ring is positioned between the base cap and the spring ring; and wherein the spring ring is positioned between the locking ring and the top ring; the base cap comprising a cylindrical sidewall, a flange coupled to a first end of the sidewall, and a closed crown coupled to a second end of the sidewall; wherein the flange comprises a first face comprising a rim and a tray, the tray projecting laterally outward form the first end of the sidewall to the rim, the rim projecting longitudinally upward from the tray, having a depressed height relative to the rim; and a second face comprising a plurality of cogs configured to couple to the rear mounting key of the camera lens; wherein the flange and the top ring combine to enclose the locking ring and the spring ring; the base cap further comprising a circuit board and an actuating device in communication with the circuit board, the circuit board being programmed to receive signals from a user and to transmit the signals to the actuating device, wherein the actuating device comprises a retractable pin that is insertable into and retractable from a through-hole in each of the top ring, the spring ring, and the locking ring upon receiving the respective signal from the user; the locking ring comprising a post projecting longitudinally upward from a first face of the locking ring through a through-hole in the spring ring, a tab projecting laterally outward from a sidewall of the locking ring, and a locking mechanism comprising a pair of ramps separated by a through-hole and a pin having a head on the first face of the locking ring and a shaft extending through the through-hole of the locking mechanism into an opening configured to receive the pin in the tray of the flange; wherein the flange further comprises a recess in the rim for the receiving the tab of the locking ring, the recess defined by a first endwall and a second endwall opposite the first endwall, wherein the tab of the locking ring rotatably slides laterally between a first and second endwalls, whereby the locking mechanism is activated when the tab is in contact with the first endwall and deactivated when the tab is in contact with the second endwall; and wherein the locking cap can be removed from the rear mounting key of the camera lens when the locking mechanism is deactivated.

In some embodiments, the sidewall comprises an impression configured to receive the actuating device such that actuating device projects outward from the sidewall.

In some embodiments, the actuating device comprises a solenoid and a housing configured to contain the solenoid, and wherein the housing is coupled to the sidewall and positioned to be in contact with an upper surface of the top ring.

In some embodiments, the actuating device further comprises a shim ring positioned between the spring ring and the top ring, wherein the flange and the top ring combine to enclose the locking ring, the spring ring, and the shim ring.

In some embodiments, the pair of ramps are a stepped ramp and a beveled ramp, respectively, and wherein the stepped ramp and the beveled ramp are oriented and inclined in the same direction about the lateral and longitudinal axes.

In some embodiments, the pin is inserted through the locking mechanism near a highest point of the inclined ramps when the lock is not activated, and wherein the pin is inserted through the locking mechanism near a lowest point of the inclined ramps when the lock is activated.

In some embodiments, the spring ring comprises a through-hole configured to receive the post projecting upward from the top surface of the locking ring, which aligns the locking ring and the spring ring with one another such that the locking ring and the spring ring will simultaneously rotate about the base cap.

In some embodiments, the spring ring comprises a biasing member laterally positioned between an exterior diameter and an internal diameter of the spring ring, the biasing member comprising a first end that is connected to and a part of the spring ring, and a second end, opposite the first end, that is not connected to the spring ring.

In some embodiments, the second end of the biasing member comprises a spring post projecting longitudinally upward toward and biased downward by the shim ring, wherein when the locking mechanism is activated, the spring post is forced downward and the biasing member is pressed against the pin in the locking mechanism, which causes a shaft of the pin to be inserted into the opening in the tray of the flange.

In some embodiments, the respective cogs of the plurality of cogs are equally spaced apart from one another, and wherein the respective cogs and corresponding spaces therebetween are configured for coupling with the rear mounting key of the camera lens.

In some embodiments, the actuating device further comprises a battery charger in communication with the circuit board, wherein a first end of the battery charger is accessible to a user via an external surface of the sidewall and a second end of the battery is connected to the circuit board.

In some embodiments, the circuit board comprises one or more wireless communication devices, a microphone, and a light.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

BRIEF DESCRIPTION OF THE DRAWINGS

A complete understanding of the present embodiments and the advantages and features thereof will be more readily understood by reference to the following detailed description, appended claims, and accompanying drawings, wherein:

Figure 1:
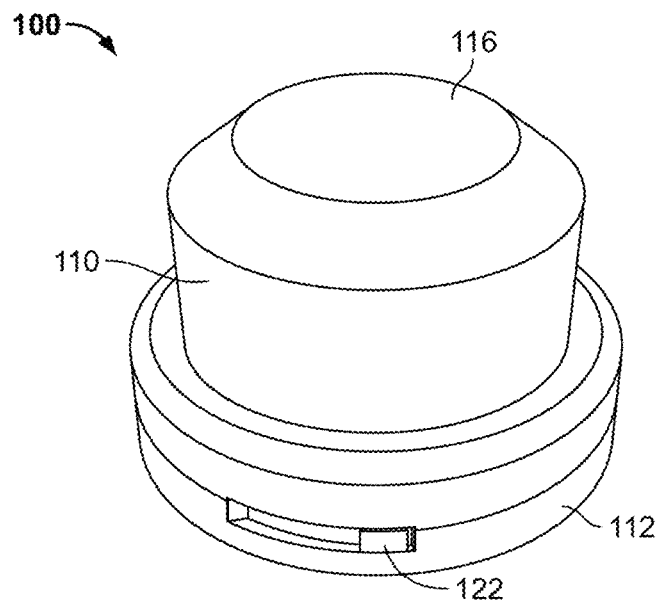
FIG. 1 is a perspective view of a locking cap, in accordance with some embodiments described herein.

The drawings are not necessarily to scale, and certain features and certain views of the drawings may be shown exaggerated in scale or in schematic in the interest of clarity and conciseness.

DETAILED DESCRIPTION

Reference will now be made in detail to the exemplary embodiment(s), examples of which is/are illustrated in the accompanying drawings. Whenever possible, the same reference characters will be used throughout the drawings to refer to the same or like parts.

Before describing the exemplary embodiments, it is noted the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the various embodiments described herein are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

The specific details of the various embodiments described herein are used for demonstration purposes only, and no unnecessary limitation or inferences are to be understood therefrom. Furthermore, as used herein, relative terms such as "horizontal," "vertical," "up," "down," "top," "bottom," and the like, as well as derivatives thereof (e.g., "horizontally," "downwardly," "upwardly," etc.) should be construed to refer to the orientation as then described or as shown in the drawing figure under discussion. These terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

Figure 13:
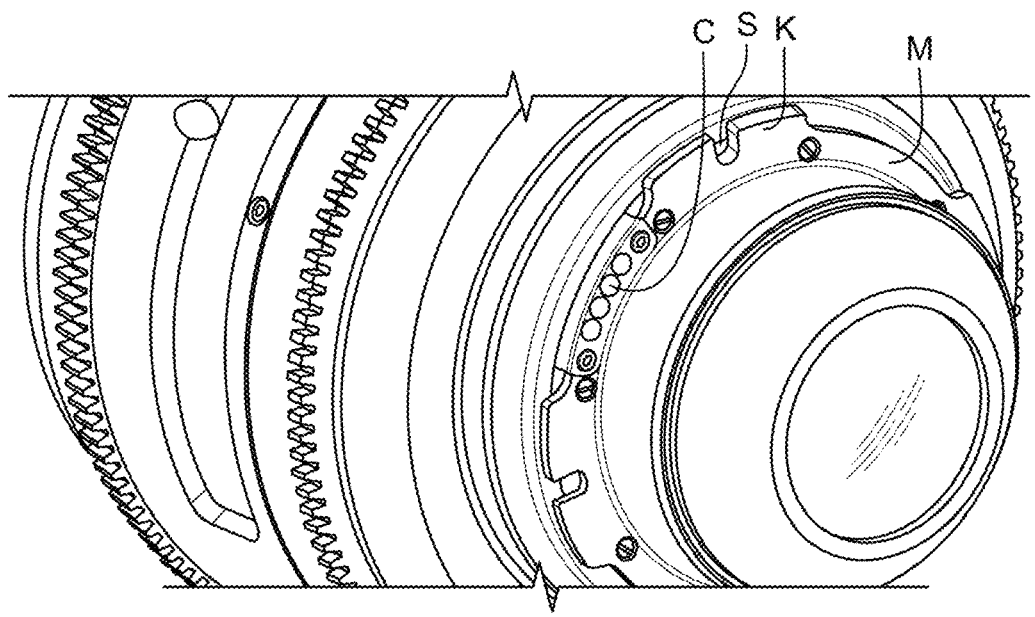
FIG. 13 is a prior art image of a rear mounting key of a camera lens.
Figure 14:
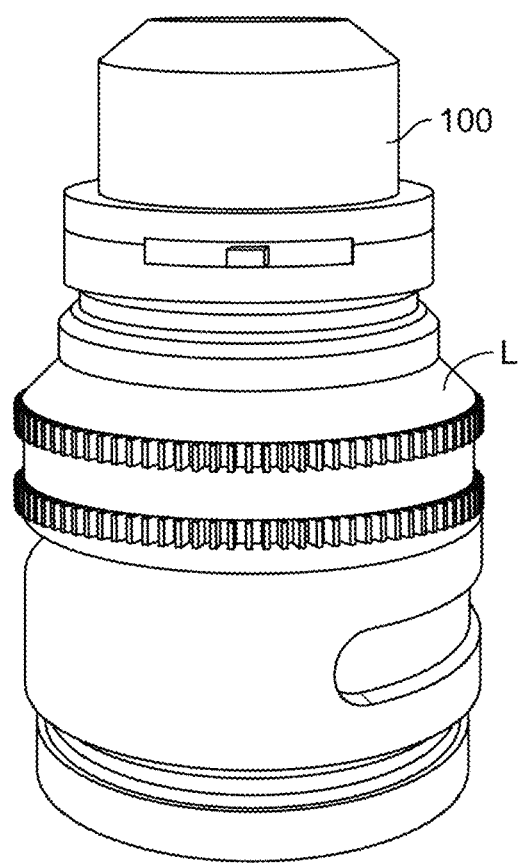
FIG. 14 is an environmental view of the locking cap of FIG. 1 applied to the rear mounting key of a camera lens.

In various embodiments, as shown in FIGS. 1-12 and 14-31, a locking cap is provided. The locking cap is configured to be rotatably coupled to the rear mounting key M of a camera lens L, as shown in FIGS. 13 and 14. In various embodiments, as shown in FIGS. 1-12 and 14, the locking cap 100 is provided. In such embodiments, the locking cap 100 can be locked after being rotatably coupled to the mounting key M. The locking cap 100 can therefore be used to thwart or prevent the unauthorized use of a camera lens L (e.g., a stolen camera lens).

Figure 7:
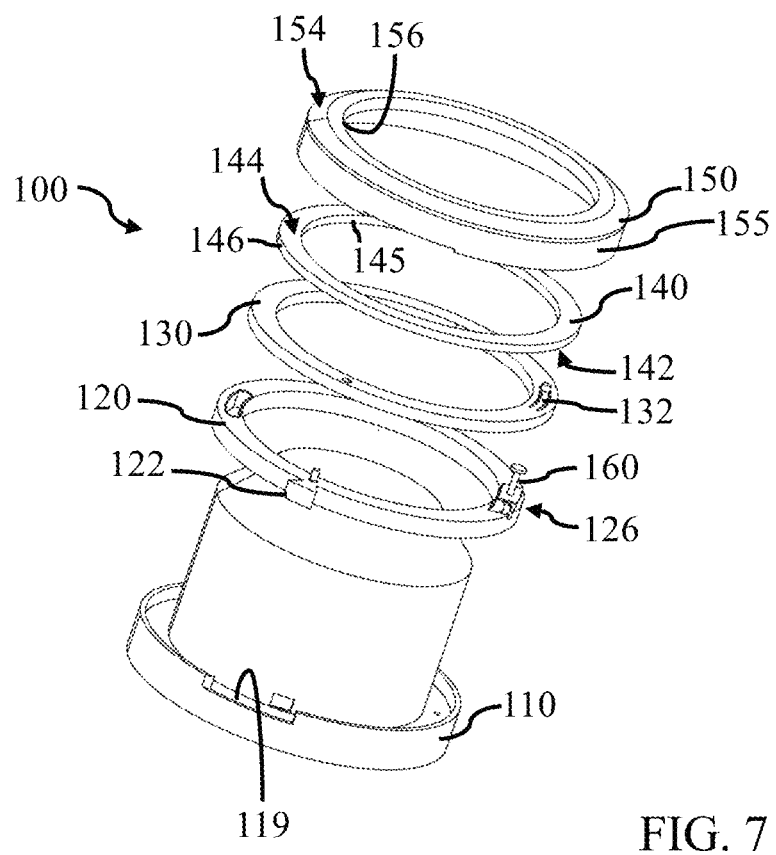
FIG. 7 is a first perspective exploded view of the locking cap of FIG. 1.
Figure 8:
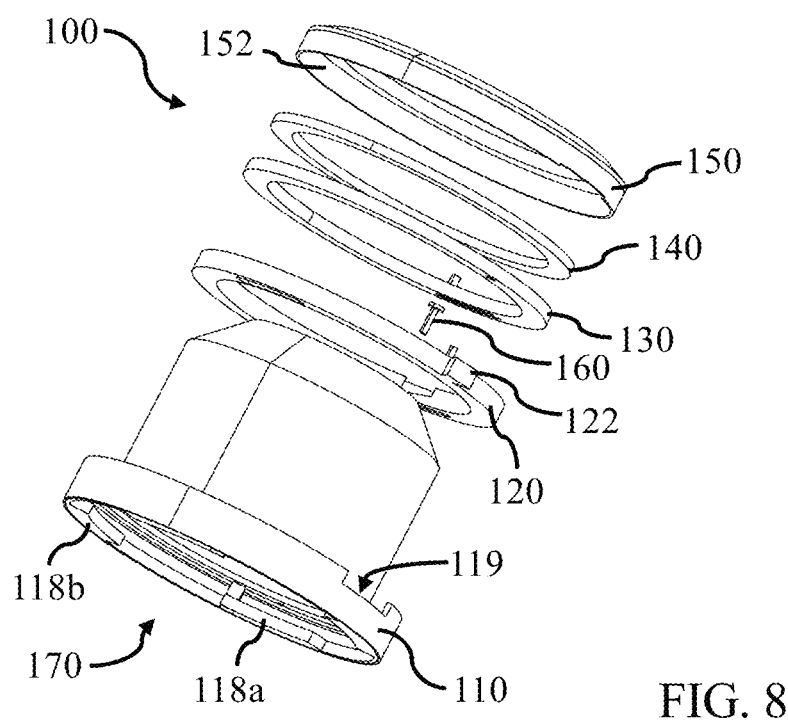
FIG. 8 a second perspective exploded view of the locking cap of FIG. 1.

In various embodiments, as shown in the exploded views in FIGS. 7 and 8, the locking cap 100 comprises a plurality of components. In some embodiments, the locking cap 100 comprises the base cap 110, the locking ring 120, the spring ring 130, and the top ring 150. In some embodiments, the locking cap 100 comprises the base cap 110, the locking ring 120, the spring ring 130, the shim ring 140, and the top ring 150.

Figure 4:
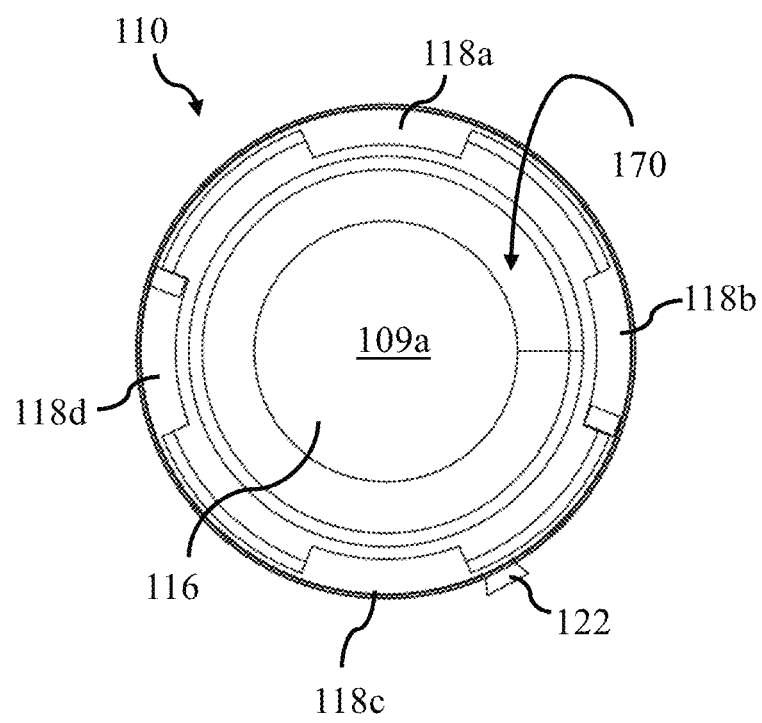
FIG. 4 is a bottom view of the locking cap of FIG. 1.
Figure 5:
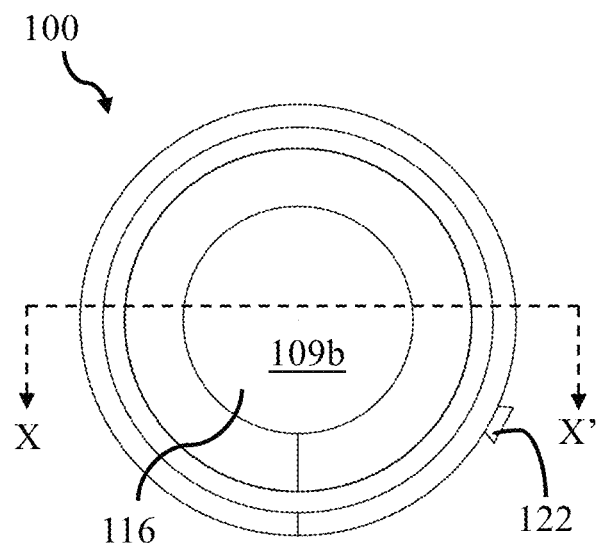
FIG. 5 is a plan view of the locking cap of FIG. 1.
Figure 6:
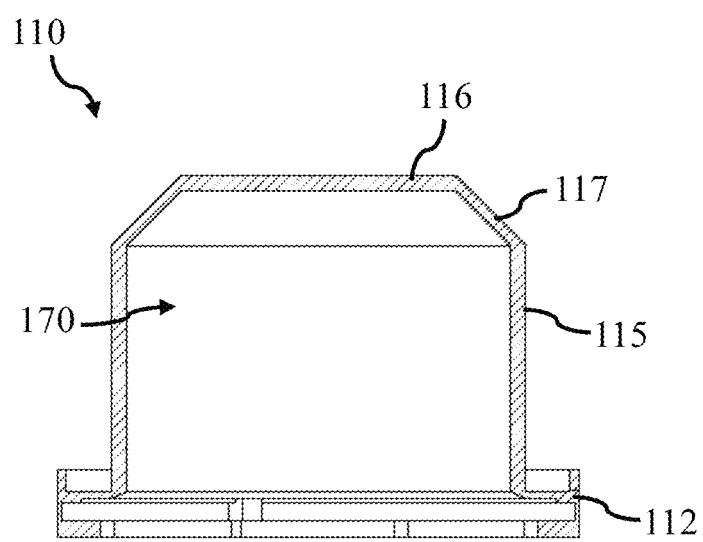
FIG. 6 is a cross-sectional side view of the locking cap in FIG. 5, taken along the X-X' line.

In some embodiments, the locking cap 100 comprises the base cap 110. The base cap 110 is shown in detail in FIGS. 1-6. As shown in FIG. 1, for example, the base cap 110 comprises the flange 112, the sidewall 115, and the crown 116. In some embodiments, the base cap 110 further comprises the bridge 117. In some embodiments, the base cap 110 comprises a generally cylindrical structure having a top surface defined by the crown 116 and a bottom surface defined by the flange 112 and the plurality of cogs 118, whereby the top and bottom surfaces are spaced apart by a predetermined distance that defines the height of the base cap 110. As shown in FIG. 4 and FIG. 5, the crown 116 comprises the lower, interior surface 109a and the upper, exterior surface 109b, respectively. In some embodiments, the shape of the base cap 110 defines the interior open volume of space 170. For example, the interior surface of the crown 116 can be seen through the open space 170 in FIG. 4. FIG. 6 shows the cross-sectional side view taken along the X-X' line in the top view of the locking cap in FIG. 5, along with the interior open volume of space 170.

In various embodiments, the base cap 100 comprises a generally cylindrical shape. In such embodiments, the base cap 100 comprises a longitudinal axis defined by the column of the sidewall 115 and a lateral axis defined by the diameter of the flange 112. In such embodiments, the sidewall 115 extends longitudinally in upward and downward directions and the flange 112 extends laterally from the sidewall 115 in outward direction.

Figure 2:
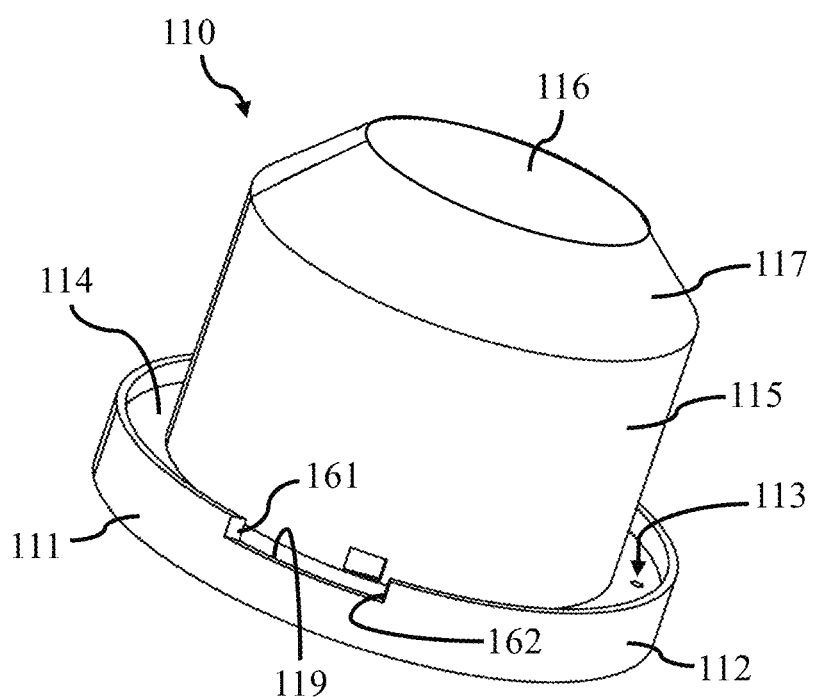
FIG. 2 is a front perspective view of the cap base of FIG. 1.
Figure 3:
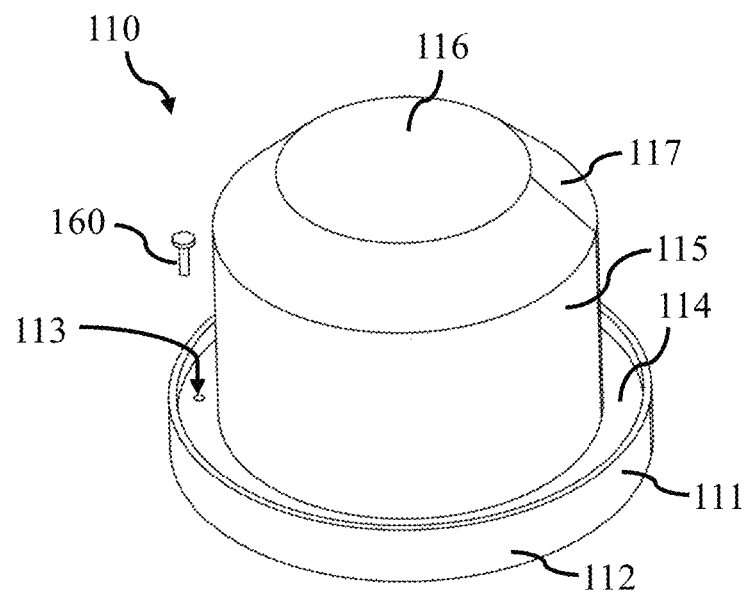
FIG. 3 is a rear perspective view of the cap base, in accordance with FIG. 1.

In some embodiments, as shown in FIGS. 2 and 3, the flange 112 is a rim projecting outward from a first, bottom end of the sidewall 115. In some embodiments, the sidewall 115 comprises a structure extending from the first, bottom end where it connects to the flange 112 to a second, upper end that is opposite the first end, where it connects to the crown 116. In some embodiments, the bridge 117 is provided as an intermediate structure extending between and connecting the crown 116 and the sidewall 115. In such embodiments, the sidewall 115 extends from the first, bottom end where it connects to the flange 112 to the bridge 117, and the bridge extends from the sidewall 115 to the second, upper end, where it connects to the crown 116. In some embodiments, the sidewall 115 comprises a cylindrical shape. In some embodiments, the sidewall 115 comprises a hollow, tubular cylindrical shape.

In some embodiments, as shown in FIGS. 2 and 3, the flange 112 comprises the rim 111 and the tray 114, which extends between and connects to each of the sidewall 115 and the rim 111. In such embodiments, the tray 114 comprises a depressed structure relative to the height of the rim 111. In some embodiments, the tray 114 comprises a surface having the opening 113. In some embodiments, the opening 113 is a circular hole or through-hole that is configured to receive the cylindrical shaft of a pin, or a portion of the cylindrical shaft of a pin, such as the pin 160 shown in FIG. 3. In some embodiments, the opening 113 is a circular through-hole that allows the pin 160 to pass through.

In some embodiments, the flange 112 comprises a plurality of cogs 118. In some embodiments, each respective cog 118 projects inward from the lower surface of the flange 112. As shown in FIGS. 4 and 8, for example, the flange 112 comprises the cogs 118a, 118b, 118c, and 118d, which are spaced apart from one another about the interior perimeter of the flange 112. In some embodiment, the cogs are equally spaced apart from one another. In some embodiments, the cogs 118a, 118b, 118c, and 118d, and the respective spaces therebetween, are configured for coupling with the rear mounting key M of a camera lens L, as shown in FIGS. 13 and 14. During use, the locking cap 100 can be inserted over and onto the rear mounting key of a camera lens so that the cogs 118 are inserted through the complementary spaces on the rear mounting key M and so the fins K on the rear mounting key M are simultaneously inserted through the respective spaces between the cogs 118a, 118b, 118c, and 118d. Once the cogs 118 of the flange 112 and the fins K of the rear mounting key M are inserted into the respective spaces configured to receive them, the rear mounting key and locking cap 100 can be counter-rotated to secure the pieces together.

In some embodiments, as shown in FIG. 2, the flange 112 comprises a recess 119 in the rim 111. In such embodiments, the recess 119 provides an opening for the tab 122 of the lock ring 120. As shown in FIGS. 1, 7, 8, and 14, the recess 119 is configured to receive the tab 122 and to guide the tab 122 as it is moved laterally between the endwalls 161, 162 of the recess 119 to lock or unlock the locking cap 100 from the rear mounting key of a camera lens. In such embodiments, the tab 122, being a component of the locking ring 120, moves when the locking ring 120 is rotated about the base cap 110.

Figure 9:
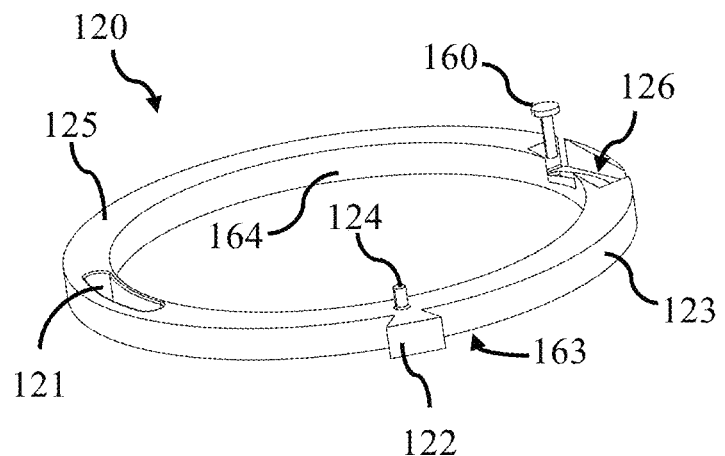
FIG. 9 is a perspective view of a lock ring without the pin inserted into the locking mechanism, in accordance with FIGS. 7 and 8.
Figure 10:
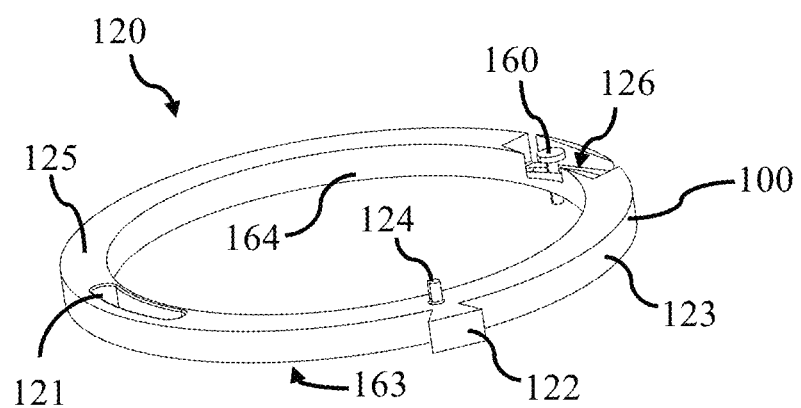
FIG. 10 is a perspective view of the lock ring of FIG. 9 with the pin inserted into the locking mechanism.
Figure 11:
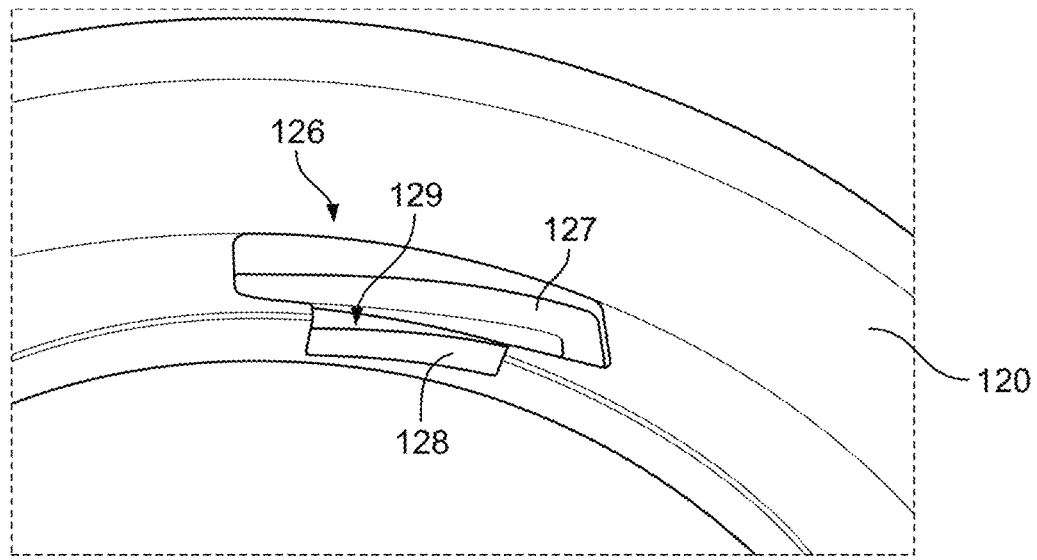
FIG. 11 is a partial, zoomed-in view of the lock ring of FIG. 9.

In some embodiments, the locking cap 100 comprises the locking ring 120. In some embodiments, the locking ring 120 comprises a generally cylindrical structure having the upper surface 125 and the lower surface 163, whereby the upper and lower surfaces 125, 163 are spaced apart by a predetermined distance that defines the height of the locking ring 120. In some embodiments, the locking ring 120 comprises a circular band structure having an interior circumferential surface 164 and an exterior circumferential surface 123, whereby the interior and exterior surfaces are spaced apart by a predetermined distance that defines the diametrical thickness of the locking ring 120. In some embodiments, the locking ring 120 is configured for assembly between the base cap 110 and the spring ring 130. As shown in FIGS. 9-11, the locking ring 120 comprises a shape corresponding to the shapes of the sidewall 115 and the rim 111 of the flange 112.

In some embodiments, the locking ring 120 comprises the tab 122 projecting outward from the exterior surface 123. The tab 122 can have any suitable shape. In some embodiments, the tab 122 comprises a keystone shape. Other suitable shapes are contemplated so long as they facilitate the function of providing the user with an ability to rotatably slide the tab 122 between the endwalls 161, 162 of the recess 119 as the locking ring 120 rotates about the base cap 110.

In some embodiments, the locking ring 120 comprises a locking mechanism 126. In such embodiments, the locking mechanism 126 is configured to receive the pin 160. For example, FIG. 9 shows the pin 160 above the locking mechanism 126 prior to being inserted, and FIG. 10 shows the pin 160 after it has been inserted into the locking mechanism 126. In some embodiments, as shown in FIG. 11, the locking mechanism 126 comprises the stepped ramp 127, the beveled ramp 128, and the through-hole 129 therebetween. In some embodiments, the stepped ramp 127 and the beveled ramp 128 are configured with an inclined structure, as shown in FIGS. 9-11, and the respective inclines are pitched (i.e., from low to high) in the same direction.

During use, the pin 160 is inserted into the locking mechanism 126 near the highest point of the pitched ramps 127, 128 (i.e., on the right side in FIG. 11). In such embodiments, the shaft of the pin 160 is inserted through the through-hole 129 and the head of the pin 160 rests on the upper surface of the pitched ramps 127, 128. As the locking ring 120 is slidably rotated about the base cap 110, using the tab 122 to cause the rotation, the locking ring 120 will rotate and the pin 160 will go downward along toward the lowest point of the pitched ramps 127, 128. As shown in FIG. 7, the pin 160 is positioned above the opening 113 of the tray 114. After assembly and during use, when the locking cap 100 is actuated to lock, the shaft of the pin 160 will be inserted through the opening 113 and through the slot S on a fin K of the rear mounting key M to lock the cap. Once locked, the tab 122 cannot be slidably moved and the locking ring 120 is no longer rotatable about the base cap 110.

In some embodiments, the locking ring 120 comprises the post 124, which projects upward from the top surface 125 of the locking ring. In such embodiments, the post 124 is sized, shaped, and otherwise configured to be received by a through-hole in a spring ring 130.

Figure 12:
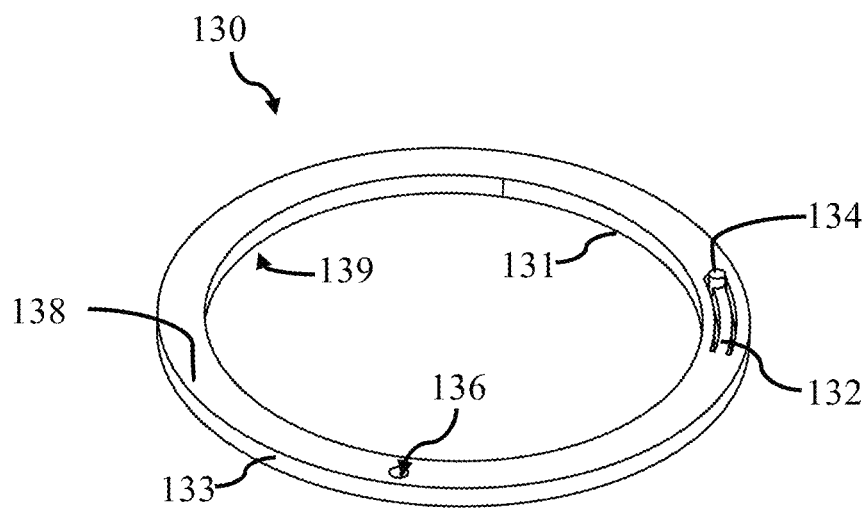
FIG. 12 is a perspective view of a spring ring, in accordance with FIG. 1.

In some embodiments, as shown in FIG. 12, the locking cap 100 comprises the spring ring 130. In some embodiments, the spring ring 130 comprises a cylindrical structure having the upper surface 138 and the lower surface 139, whereby the upper and lower surfaces 138, 139 are spaced apart by a predetermined distance that defines the height of the spring ring 130. In some embodiments, the spring ring 130 comprises a circular band structure having an interior circumferential surface 131 and an exterior circumferential surface 133, whereby the interior and exterior surfaces are spaced apart by a predetermined distance that defines the diametrical thickness of the spring ring 130. During assembly of the locking cap 100, the spring ring 130 is positioned between the locking ring 120 and the shim ring 140 and/or top ring 150.

In some embodiments, the spring ring 130 comprises the through-hole 136, which extends between the upper and lower surfaces 138, 139. In such embodiments, the through-hole 136 is configured to receive the post 124 projecting upward from the top surface 125 of the locking ring 120. During assembly of the locking cap 100, the post 124 is inserted into the through-hole 136, which will align the locking ring 120 and the spring ring 130 with one another, such that the locking and spring rings 120, 130 will simultaneously rotate about the base cap 110.

In some embodiments, the spring ring 130 comprises the spring 132 (biasing member). In some embodiments, the spring 132 is provided by a U-shaped opening, or cut-away, on the upper surface 138 of the spring ring 130, as shown in FIGS. 7 and 12. In such embodiments, the spring 132 comprises a first end that is connected to and a part of the upper surface 138, and a second end, opposite the first end, that is not connected to the upper surface 138. In some embodiments, the spring 132 comprises the post 134 on the second end that is not connected to the upper surface 138. The unconnected second end of the spring 132 provides a bias force. In some embodiments, the spring post 134 projects upward from the upper surface of the spring 132. As shown in FIGS. 7 and 12, prior to assembly, the spring post 134 projects above (i.e., not coplanar) the upper surface 138 of the spring ring 130. After the locking cap 100 has been assembled, the spring post 134 is forced downward by the top ring 150 and the shim ring 140. After assembly and when the locking cap 100 is actuated to lock, the spring post 134 is forced downward and the spring 132 is pressed against the head of the pin 160, positioned below the spring 132, which causes the shaft of the pin 160 to be inserted into and through the opening 113 of the tray 114. After the pin 160 is inserted through the opening 113, and into the slot S of the rear mounting key M, the cap is locked and the user will not be allowed to slide the tab 122, and the locking ring 120 will no longer be rotatable about the base cap 110.

In some embodiments, as shown in FIGS. 7 and 8, the locking cap 100 comprises the top ring 150. In such embodiments, the top ring 150 comprises a generally cylindrical structure having the upper surface 154 and the lower surface 152, whereby the upper and lower surfaces 154, 152 are spaced apart by a predetermined distance that defines the height of the top ring 150. In some embodiments, the top ring 150 comprises a circular band structure having an interior circumferential surface 156 and an exterior circumferential surface 155, whereby the interior and exterior surfaces are spaced apart by a predetermined distance that defines the diametrical thickness of the top ring 150. In some embodiments, the upper surface 154 is beveled from the exterior circumferential surface 155 toward the interior circumferential surface 156 in a manner that is consistent with the three-dimensional shapes of the flange 112, the tray 114, and the sidewall 115 of the base cap 110. In some embodiments, after assembly of the locking cap 100, the top ring 150 covers the locking ring 120, the spring ring 130, and the flange 112 of the base cap 110. The top ring 150 reinforces the shim ring 140 and holds the lower rings together.

In some embodiments, as shown in FIGS. 7 and 8, the locking cap 100 comprises the shim ring 140. In such embodiments, the shim ring 140 comprises a cylindrical structure having the upper surface 144 and the lower surface 142, whereby the upper and lower surfaces 144, 142 are spaced apart by a predetermined distance that defines the height of the shim ring 140. In some embodiments, the shim ring 140 comprises a circular band structure (e.g., disk, washer) having an interior circumferential surface 145 and an exterior circumferential surface 146, whereby the interior and exterior surfaces are spaced apart by a predetermined distance that defines the diametrical thickness of the shim ring 140. In some embodiments, the upper and lower surfaces 144, 142 are flat or substantially flat. In some embodiments, after the locking cap 100 has been assembled, the shim ring 140 is positioned between the spring ring 130 and the top ring 150. In such embodiments, the shim ring 140 can function as a compressor ring that compresses the spring 132 of the spring ring 130 downward toward the locking ring 120. In some embodiments, the shim ring 140 can further function as a spacer that allows clearance for the spring ring 130 lowering the friction to rotational force on the locking mechanism 126.

In various embodiments, as shown in FIGS. 15-22, the locking cap 200 is provided. The locking cap 200 is configured to be rotatably coupled to fins K of the rear mounting key M of a camera lens L, in the same manner as shown in FIGS. 13 and 14 with the locking cap 100. In such embodiments, the locking cap 200 can be locked after being rotatably coupled to the rear mounting key M. The locking cap 200 can therefore be used to thwart or prevent the unauthorized use of a camera lens L (e.g., a stolen camera lens).

Figure 16:
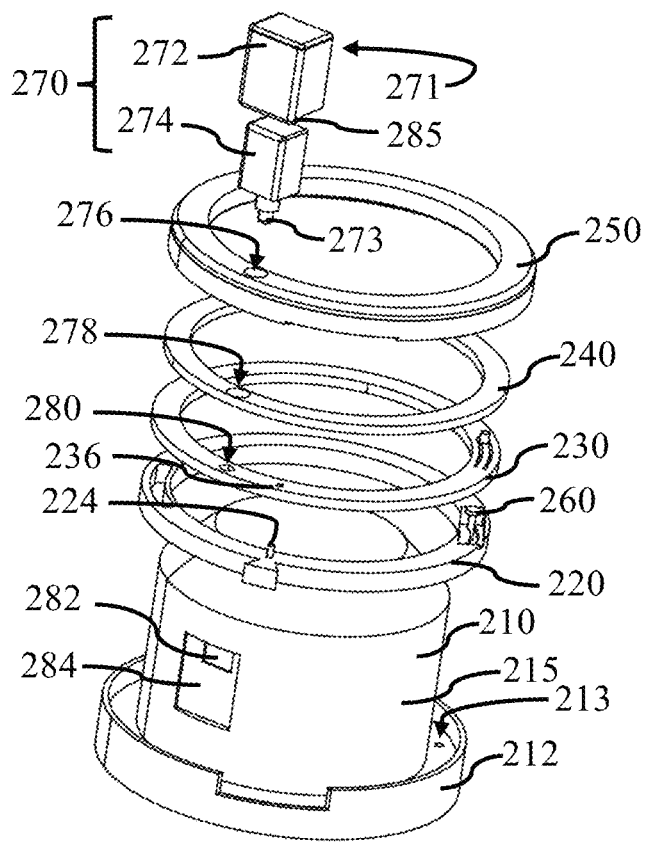
FIG. 16 is an exploded view of the locking cap of FIG. 15.

In various embodiments, as shown in the exploded views in FIG. 16, the locking cap 200 comprises a plurality of components. In some embodiments, the locking cap 200 comprises the base cap 210, the locking ring 220, the spring ring 230, and the top ring 250. In some embodiments, the locking cap 200 comprises the base cap 210, the locking ring 220, the spring ring 230, the shim ring 240, and the top ring 250.

In some embodiments, the locking cap 200 comprises the base cap 210. In some embodiments, the base cap 210 comprises the flange 212, the sidewall 215, and the crown 216, in a similar manner as provided for the base cap 110. In some embodiments, the base cap 210 further comprises the bridge 217 in a similar manner as provided for the base cap 110. In some embodiments, the base cap 210 comprises a generally cylindrical structure having a top surface defined by the crown 216 and a bottom surface defined by the flange 212 and the plurality of cogs 218a-218d, in a similar manner as provided for the base cap 110, whereby the top and bottom surfaces are spaced apart by a predetermined distance that defines the height of the base cap 210.

In various embodiments, the base cap 200 comprises a generally cylindrical shape. In such embodiments, the base cap 200 comprises a longitudinal axis defined by the column of the sidewall 215 and a lateral axis defined by the diameter of the flange 212. In such embodiments, the sidewall 115 extends longitudinally in upward and downward directions and the flange 212 extends laterally from the sidewall 215 in outward direction.

Figure 15:
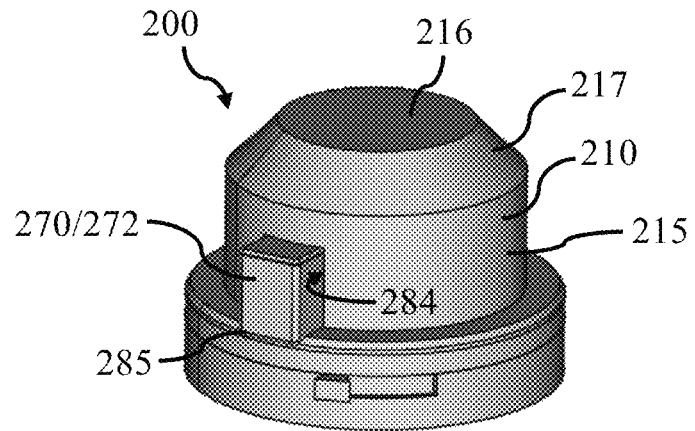
FIG. 15 is an oblique view of a locking cap, in accordance with some embodiments described herein.

In some embodiments, as shown in FIGS. 15 and 16, the locking cap 200 further comprises the impression 284 in the sidewall 215 of the base cap 210. In such embodiments, the impression 284 is configured to receive the actuating device 270. In such embodiments, the impression 284 can be any suitable shape. In this context, the suitability of the shape is based on the corresponding shape of the actuating device 270. In some embodiments, as shown in FIG. 16, the actuating device 270 comprises the housing 272 and the solenoid 274.

In some embodiments, the housing 272 is sized and shaped to be slidably inserted into the impression 284, and further to securely contain the solenoid 274. In some embodiments, the housing 272 is sized and shaped to be positioned on the upper surface of the top ring 250, as shown in FIGS. 15 and 16. In some embodiments, for example, the housing 272 comprises the lip 285 projecting from its lower, bottom facing surface, whereby the lip 285 is configured to be positioned on and in contact with the beveled edge surface of the top ring 250.

In some embodiments, the solenoid 274 comprises the pin 273 projecting downward from the lower, bottom surface of the solenoid. In such embodiments, the top ring 250 comprises the through-hole 276, the shim ring 240 comprises the through-hole 278, and the spring ring 230 comprises the through-hole 280. The through-holes 276, 278, and 280 can have any suitable size and shape, whereby the suitability is based on the size and shape of the pin 273. In some embodiments, the pin 273 projecting downward from the bottom surface of the solenoid can be received by the through-holes 276, 278, and 280. In such embodiments, the pin 273 is insertable into and through the through-holes 276, 278, and 280. In some embodiments, the locking ring 220 does not include a through-hole configured to receive the pin 273. In such embodiments, the pin 273 projects downward from the bottom surface of the solenoid 274 through the through-holes 276, 278, and 280 toward the top surface of the locking ring 220; and the through-holes 276, 278, and 280 are positioned about the top ring 250, the shim ring 240, and the spring ring 230, respectively, such that the rings remain aligned with one another.

In some embodiments, the locking ring 220 comprises the post 224 projecting from the top surface. In such embodiments, the spring ring 230 comprises the through-hole 236, which is configured to receive the post 224. After the post 224 has been inserted through the through-hole 236, the locking ring 220 and the spring ring 230 will remain aligned with one another with respect to the sidewall 214 of the base cap 210. In such embodiments, when the locking ring 220 is rotated about the sidewall 214, the spring ring 230 will simultaneously rotate about the sidewall 214 because the locking and spring rings are removably coupled to one another by the post 224.

Figure 18:
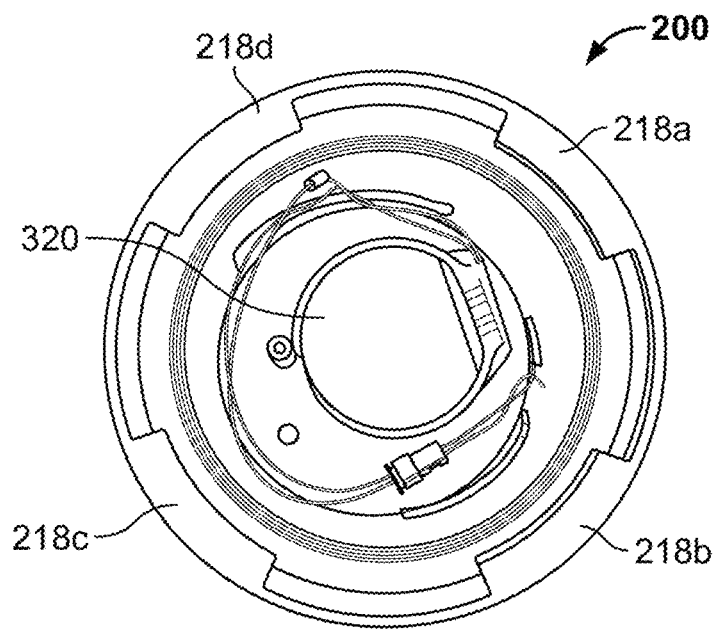
FIG. 18 is a bottom view of the locking cap of FIG. 15.

In some embodiments, as shown in FIGS. 15, 16, and 18-20, the housing 272 comprises an opening on its interior face 271 (not shown) such that one or more components (e.g., wires) from the solenoid 274 can be operatively coupled to the circuitry device 300 contained within the locking cap. In some embodiments, as shown in FIG. 16, the impression 284 comprises the passage 282 through which the one or more solenoid components can access and communicate with the circuitry device 300, which is located on the interior of the locking cap 200 after assembly, as shown in FIG. 18.

Figure 17:
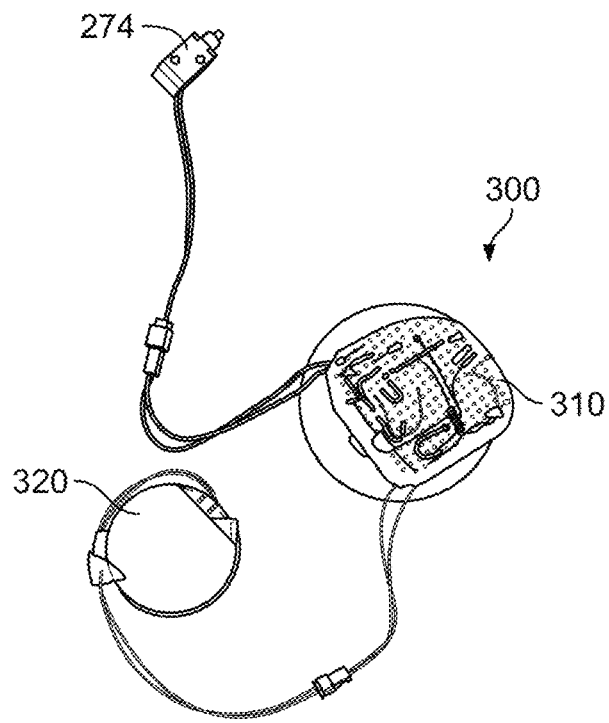
FIG. 17 is a perspective view of a circuitry device that can be used with the locking cap of FIG. 15.
Figure 19:
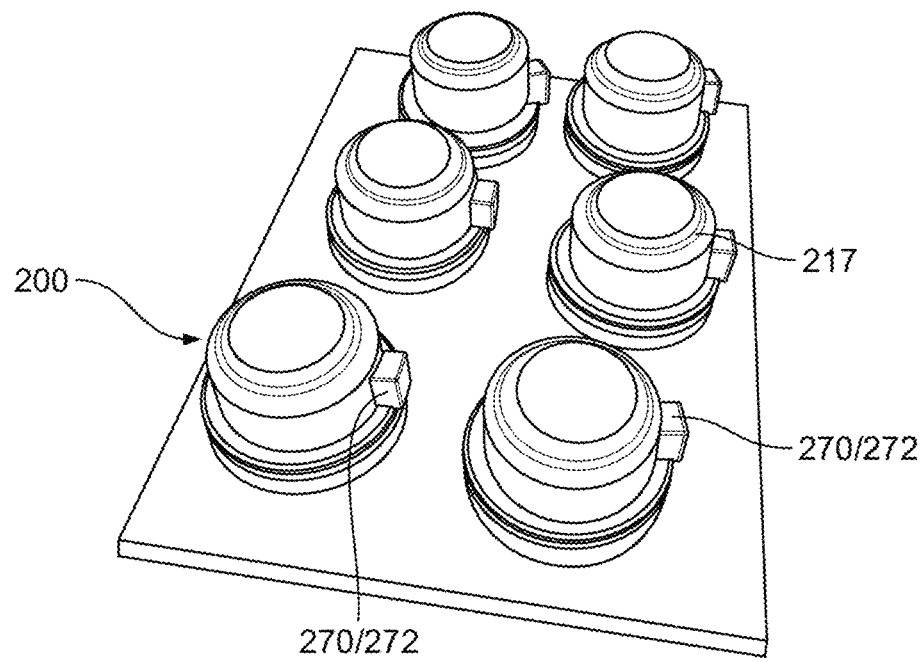
FIG. 19 is a perspective view of exemplary locking caps of FIG. 15.
Figure 20:
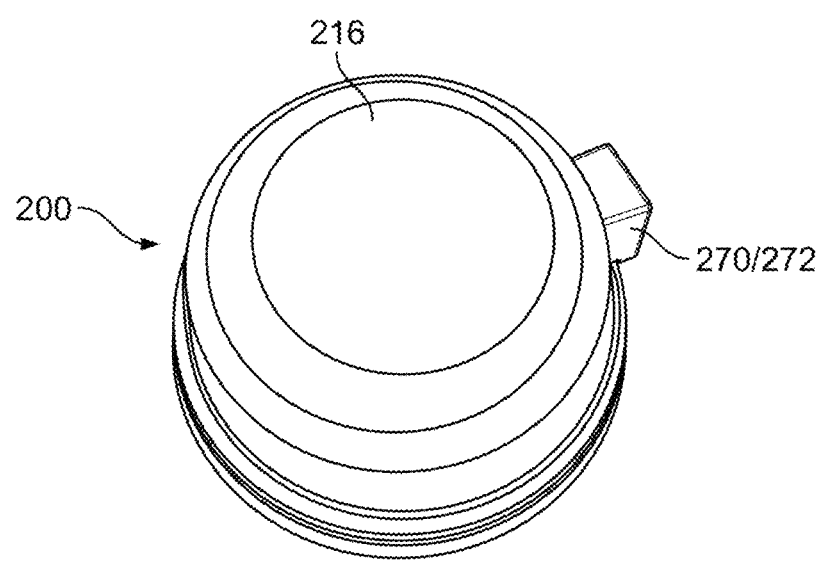
FIG. 20 is a perspective view of an exemplary locking cap of FIG. 15.
Figure 21:
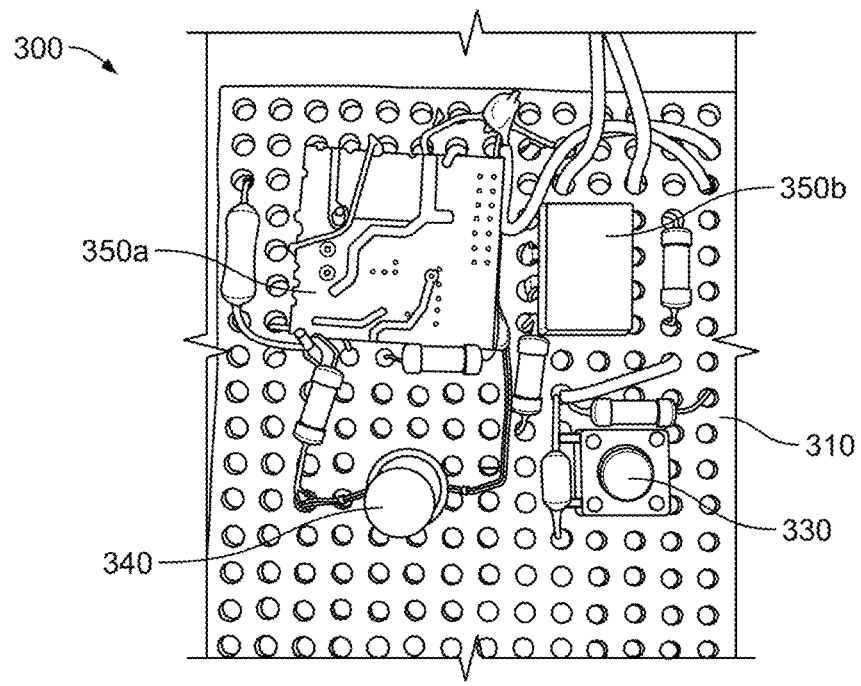
FIG. 21 is a plan view of a circuitry device that can be used with the locking cap of FIG. 15.

In some embodiments, as shown in FIGS. 17-22, the circuitry device 300 comprises a plurality of components, including, for example, the circuit board 310 and the various subcomponents attached thereto, the solenoid 274, and the battery 320. As shown in FIG. 17, the solenoid 274 is attached to the circuit board 310 with wires. After assembly, the solenoid 274 is contained in the housing 272 and the wires are passed through the passage 282 to be connected to the circuit board 310. In some embodiments, the various subcomponents of the circuitry device 300 include the switch 330, as shown in FIG. 21. In such embodiments, the switch 330 is configured to execute one or more commands, including, for example, activating or deactivating the light 340. In some embodiments, as shown in FIGS. 19 and 20, the light 340 illuminates one or more portions of the locking cap 200. As shown in FIG. 19, for example, the light 340 illuminates the bridge 217. In FIG. 20, the light 340 illuminates the crown 216 and the bridge 217. In such embodiments, the crown 216 and/or the bridge 217 can be comprised of, at least partially, a translucent material.

Figure 22:
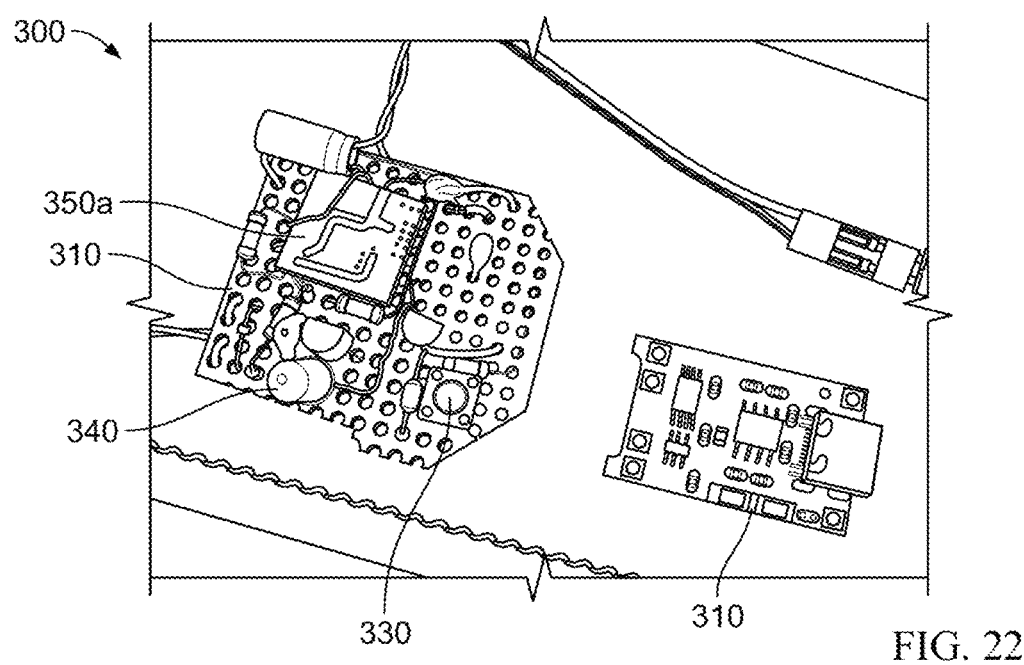
FIG. 22 is a plan view of a circuitry device that can be used with the locking cap of FIG. 15.

In some embodiments, as shown in FIGS. 21 and 22, the circuitry device 300 comprises one or more wireless communication devices (e.g., 350a and 350b) that can communicate with an electronic device, an app configured for or installed on an electronic device, key fob, computer, etc. In some embodiments, the one or more wireless communication devices 350 (e.g., 350a and 350b) is a Bluetooth chip, a Wi-Fi chip, near-field communication (NFC) component, etc. In some embodiments, the switch 330 is configured to pair and/or unpair the one or more wireless communication devices 350 with an electronic device, an app configured for or installed for an electronic device, key fob, computer, etc. In some embodiments, as shown in FIGS. 17, 21, and 22, the circuitry device 300 comprises one or more capacitors, resistors, lights, switches, wires, etc., each of which are arranged and configured to execute the various functionalities associated with of the locking cap 200.

During use, for example, the components of the circuitry device 300 are configured to wirelessly control the solenoid 274 of the actuating device 270, which is configured to lock or unlock the locking cap 200 from the rear mounting key M of a camera lens L. In various embodiments, the locking cap 200 is configured to be removably coupled to the fins K of the mounting key M. In some embodiments, the circuitry device 300 is activated by wireless communication by an external device, which communicates signals and instructions to lock or unlock the locking cap 200. In some embodiments, for example, the solenoid 274 allows the rotation of the lock ring 220, which allows the pin 260 to pass through the opening 213. In such embodiments, the pin 260 then enters the slot S of a fin K of the rear mounting key M. After the pin 260 is inserted into the slot S, the locking cap 200 cannot be rotatably withdrawn from the rear mounting key M.

In various embodiments, as shown in FIGS. 23-31, the locking cap 400 is provided. The locking cap 400 is configured to be rotatably coupled to the fins K of the rear mounting key M of a camera lens L, in the same manner shown in FIGS. 13 and 14 for the locking cap 100. In such embodiments, the locking cap 400 can be locked to the camera lens L after being rotatably coupled to the rear mounting key M.

Figure 23:
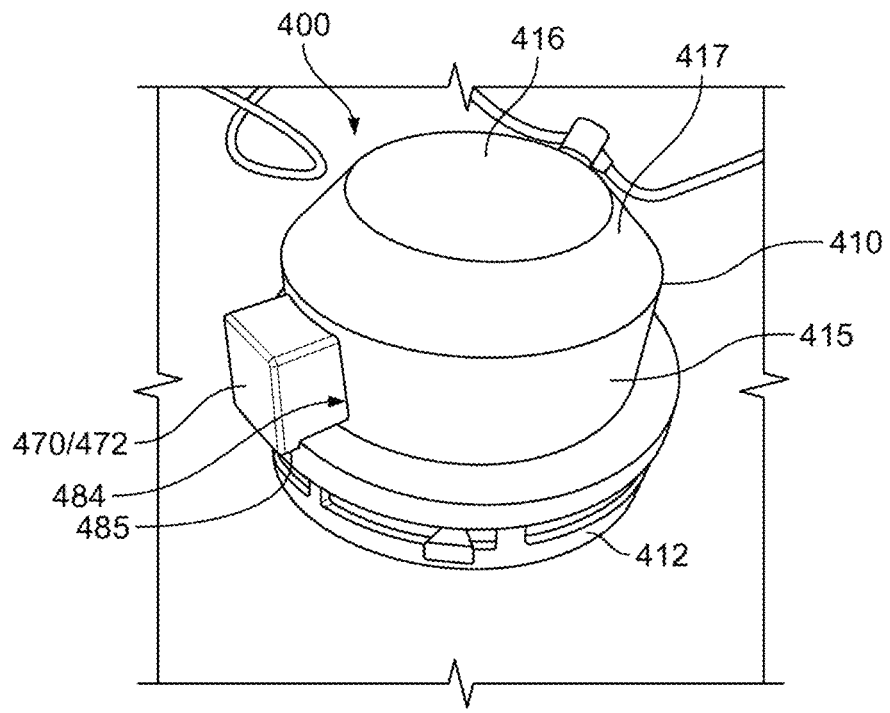
FIG. 23 is an oblique view of a locking cap, in accordance with some embodiments described herein.
Figure 26:
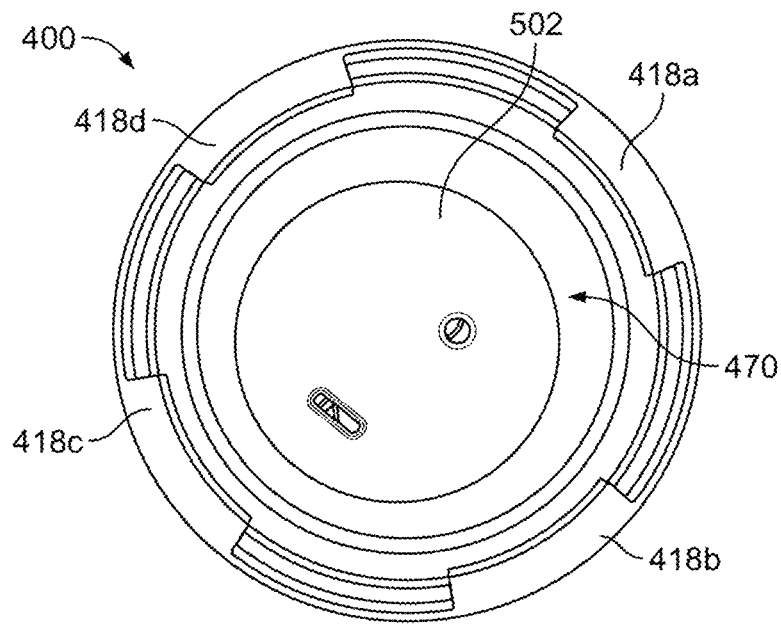
FIG. 26 is a bottom view of the locking cap of FIG. 23.

In some embodiments, the locking cap 400 comprises a plurality of components, whereby the respective components correspond to the components in the locking cap 200. For example, as shown in FIG. 23, the locking cap 400 can comprise the base cap 410. In some embodiments, the base cap 410 comprises the flange 412, the sidewall 415, and the crown 416, in a similar manner as provided for the base cap 210 shown in FIG. 16. In some embodiments, the base cap 410 further comprises the bridge 417 in a similar manner as provided for the base cap 210. In some embodiments, the base cap 410 comprises a generally cylindrical structure having a top surface defined by the upper surface of the crown 416. In some embodiments, the base cap 410 comprises a bottom surface defined by the lower surface of the flange 412 and the lower surface of the plurality of cogs 418a-418d, as shown in FIG. 26. In a similar manner as provided for the base cap 210, the top and bottom surfaces of the base cap 410 are spaced apart by a predetermined distance that defines the height of the base cap 410.

In various embodiments, the base cap 400 comprises a generally cylindrical shape. In such embodiments, the base cap 400 comprises a longitudinal axis defined by the column of the sidewall 415 and a lateral axis defined by the diameter of the flange 412. In such embodiments, the sidewall 415 extends longitudinally in upward and downward directions and the flange 412 extends laterally from the sidewall 415 in outward direction.

Figure 28:
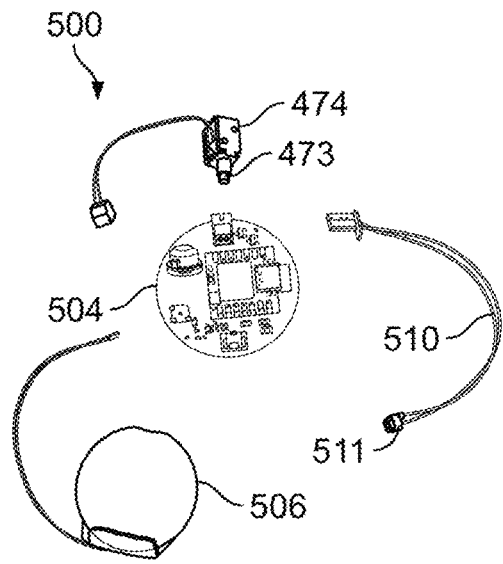
FIG. 28 is a perspective view of a circuitry device with unconnected components, in accordance with some embodiments described herein.
Figure 29:
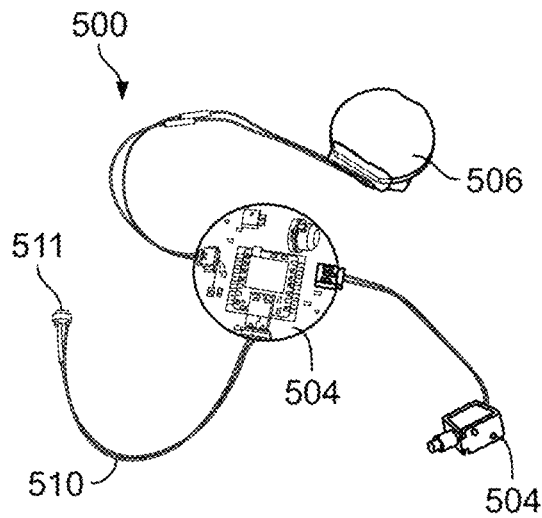
FIG. 29 is a perspective view of a circuitry device with connected components, in accordance with some embodiments described herein.

In some embodiments, as shown in FIG. 23, the locking cap 400 further comprises the impression 484 in the sidewall 415, in a similar manner as the impression 284 in the sidewall 215 of the base cap 210. In such embodiments, the impression 484 is configured to receive the housing 472 of the actuating device 470, which will function in the same manner as the actuating device 270 of the locking cap 200. The impression 484 can be any suitable shape. In this context, the suitability of the shape is based on the corresponding shape of the actuating device 470 and the housing 472. In some embodiments, the actuating device 470 comprises the solenoid 474 (FIGS. 28 and 29). In such embodiments, the solenoid 474 is contained within the housing 472, in a similar manner as provided for the locking cap 200.

Figure 24:
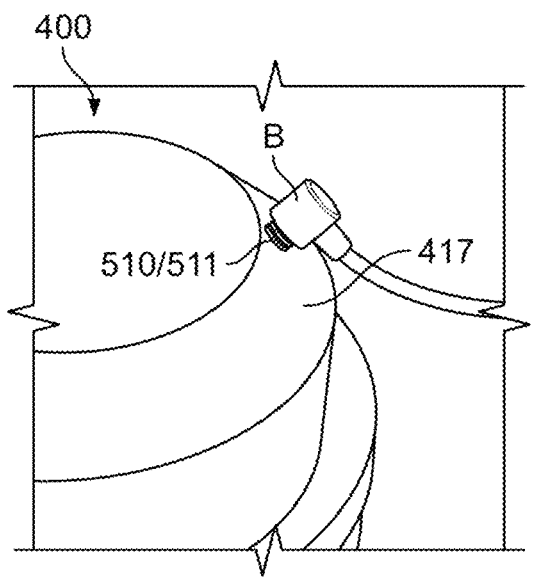
FIG. 24 is a partial oblique view of the locking cap of FIG. 23 engaged with a battery charger, in accordance with some embodiments described herein.
Figure 25:
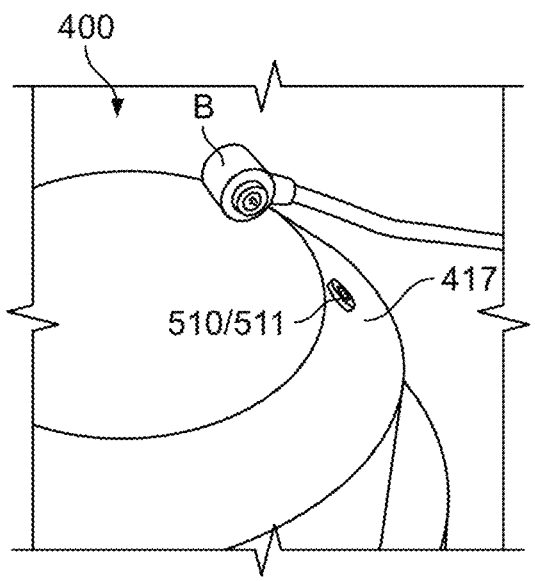
FIG. 25 is a partial oblique view of the locking cap of FIG. 23 disengaged with a battery charger, in accordance with some embodiments described herein.

In various embodiments, the locking cap 400 comprises the charger 510. In some embodiments, the charger 510 comprises a first end 511 that is embedded into the base cap 410 and which is accessible from the exterior surface of the base cap 410. In some embodiments, as shown in FIG. 24 and FIG. 25, the charger 510 comprises a first end 511 that is embedded into the bridge 417 of the base cap 410. In alternative embodiments, the charger 510 comprises a first end that is embedded into the sidewall 415 or crown 416 of the base cap 410. In various embodiments, the charger 510 comprises the first end 511 having an exposed, outward-facing connector that is configured to connect with a complementary connector of the charging cord B, which would be connected on its opposite end to an outlet, USB port, or other receptacle capable of delivering electricity to the charger 510. The connector at the first end 511 of the charger 510 and the complementary connector of the charging cord B can be coupled together via any suitable components. In some embodiments, for example, the connector at the first end 511 of the charger 510 and the complementary connector of the charging cord B are connected using a pair of magnets (or a magnet and a complementary ferromagnetic material), as shown in FIGS. 24 and 25. Alternative connectors can be used, including, for example, a male jack and female port.

Figure 27:
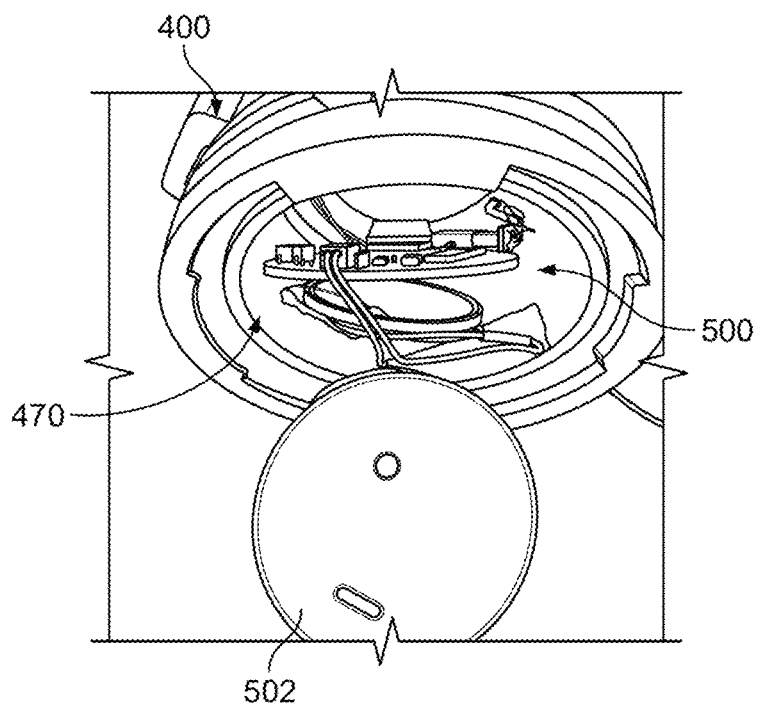
FIG. 27 is a partial oblique bottom view the locking cap of FIG. 23.

In various embodiments, the locking cap 400 comprises a circuitry device. In some embodiments, the circuitry device is enclosed within the locking cap 400. As shown in FIG. 26 and FIG. 27, for example, the locking cap 400 includes the interior open volume of space 470, which is defined by the shape of the base cap 410, and the circuitry device 500 is insertable and enclosable within the interior open volume 470. In some embodiments, as shown in FIG. 26, the circuitry device 500 is contained within the interior open volume 470 by the partition 502. In some embodiments, the circuitry device 500 is permanently fixed within the base cap 410 by the partition 502. In such embodiments, the partition 502 is adhered to the interior wall of the base cap 410 using, for example, a glue or resin. In some embodiments, the circuitry device 500 is temporarily secured within the base cap 410 by a removeable partition. In such embodiments, the partition 502 can be removably form-fitted or snap-fitted into the base cap 410 or a groove in the interior surface of the base cap 410. In some embodiments, as shown in FIG. 26 and FIG. 27, the partition 502 can include one or more through-holes for viewing and/or accessing the circuitry device 500 or a subcomponent thereof contained within the closed area demarcated by the base cap 410 and the partition 502.

In various embodiments, the circuitry device 500 comprises a plurality of components. As shown in FIGS. 27-31, for example, the circuitry device 500 can comprise a suitable circuit board or microcontroller unit 504 and the various subcomponents attached thereto, the battery 506, and the charger 510. FIG. 28 shows the microcontroller unit 504, the battery 506, the battery charger 510, and the solenoid 474 as unconnected components. FIG. 29 shows the microcontroller unit 504, battery 506, battery charger 510, and solenoid 474 connected and assembled as the circuitry device 500. During use, the battery charger 510 is configured to receive electric current from a source (e.g., outlet, USB port) and transmit that current to the microcontroller unit 504, which will in turn transmit the current to recharge the battery 506.

In some embodiments, the circuitry device 500 comprises a plurality of subcomponents, in a similar manner as described for the circuitry device 300, including one or more wireless communication devices, switches, microphones, lights, speakers, along with appropriate capacitors, resistors, wires, etc. In some embodiments, the one or more wireless communication devices can be configured to communicate with an electronic device, an app for an electronic device, a key fob, a computer, etc. In some embodiments, the one or more of the wireless communication devices is a Bluetooth chip, a Wi-Fi chip, near-field communication (NFC) component, etc. In some embodiments, a switch is configured to pair and/or unpair the one or more wireless communication devices with an electronic device, an app for an electronic device, key fob, computer, etc. In some embodiments, the circuitry device 500 comprises one or more capacitors, resistors, lights, switches, wires, etc., each of which are arranged and configured to execute the various functionalities associated with of the locking cap 500.

Figure 30:
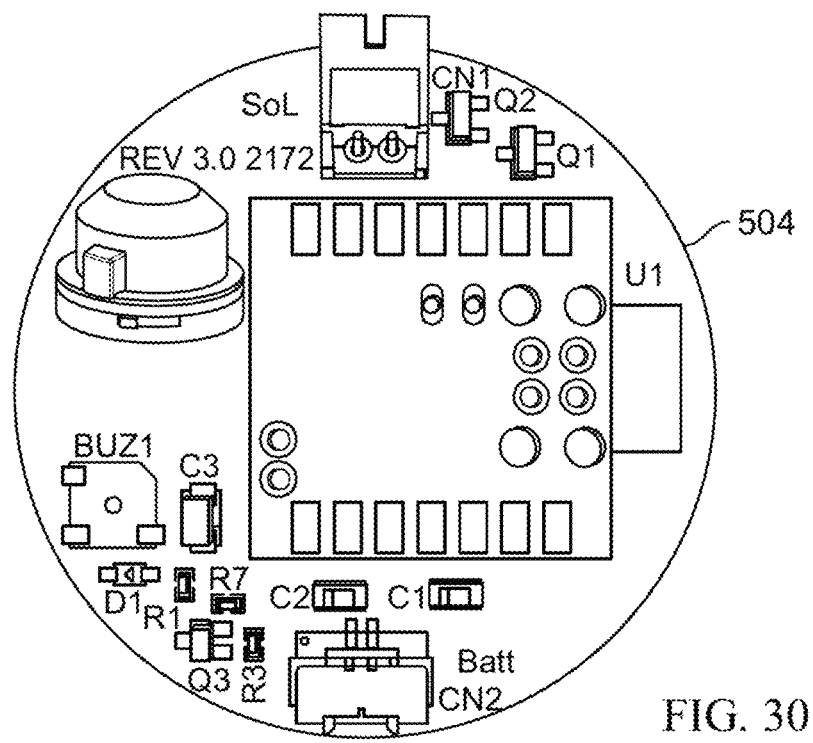
FIG. 30 is a top view of a circuit board, in accordance with some embodiments described herein.

In some embodiments, the circuitry device 500 comprises a suitable circuit board and/or microcontroller unit 504. In some embodiments, as shown in FIGS. 28-30, the microcontroller unit 504 is a commercially available microcontroller unit. A suitable circuit board and/or microcontroller unit, includes, for example, a Seeed Studio XIAO nRF52840 Sense device, which is a board with a versatile microcontroller (e.g., the Nordic nRF52840 chip), wireless capabilities, and onboard functionality, including a digital microphone and inertial measurement unit (IMU). The Seeed Studio XIAO nRF52840 Sense device has a power consumption of 5 μA in the deep sleep mode, and the embedded BQ25101 chip supports battery charge management that prolongs its use time. The device supports the USB Type-C interface that can supply power and download code, an on-chip memory of 1 MB flash and 256 kB RAM, and an onboard memory of 2 MB Quad Serial Peripheral Interface (QSPI) flash. The device includes eleven digital input/output (i/o) components that can be used as pulse-width modulation (PWM) pins and six analog i/o components that can be used as analog to digital converter (ADC) pins. The device supports universal asynchronous receiver/transmitter (UART), inter-integrated circuit (IIC), and serial peripheral interface (SPI) common serial ports. The device has a reset button, a 3-in-one LED, a charge LED, and a Bluetooth antenna on board, which allowing developers to debug their code.

In some embodiments, the microcontroller unit 504 comprises a digital microphone, which allows the locking cap 400 to be voice-activated. In some embodiments, the microcontroller unit 504 comprises an IMU that allows the locking cap 400 to be activated by certain motions (e.g., falling, walking, running, etc.).

Figure 31:
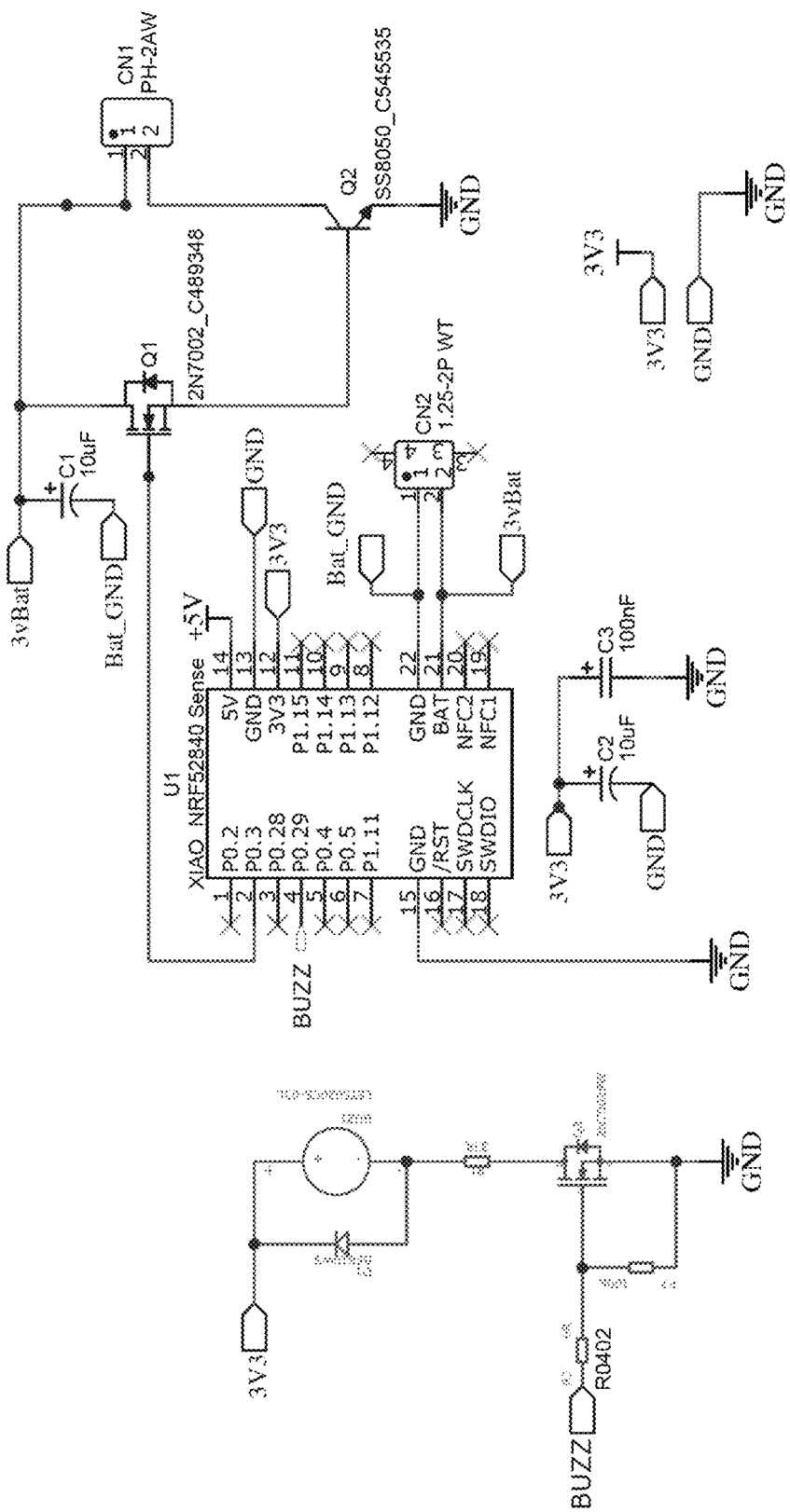
FIG. 31 a schematic drawing of the circuitry used in accordance with some embodiments described herein.

FIG. 31 is a schematic drawing showing an exemplary configuration of the microcontroller unit 504. In the figure, the XIAO chip is labeled "U1." The chip has several general purpose I/O (input/output) pins labeled with a port number, such as "P0.2." The port number is shown next to the pin number, which is assignable to an external physical pin. The number (e.g., "0.2") is the port pin designation. Components are connected to a physical. For example, the buzzer is connected to PIN 4 of the chip and is addressed in the firmware as PORT ZERO (0). PIN 29. (internally). The solenoid "SOL" is connected to connector "CN1" to the PC board output drive transistors Darlington pair, which are driven by GPIO (PORT ZERO (0), PIN 3), which corresponds to physical PIN 2 of the chip. The battery is directly connected to two pads on the bottom of the chip and the traces are connected to a "CN2" connector where the lithium power (Lipo) battery plugs into. The magnetic end charging "pigtail" comprised of the magnetic 2 conductor connector on one end and a USB "C MALE-Type" connecter on the other end, plugs into the Xiao "U1" microchip's USB female connector to charge the battery through "U1" Xiao's onboard Lipo charger chip.

During use, for example, the components of the circuitry device 500 are configured to wirelessly control the actuating device 470, which is configured to lock or unlock the locking cap 400 from the rear mounting key M of a camera lens L, as shown in FIG. 13 and FIG. 14 for locking cap 100. In various embodiments, the locking cap 400 described herein is configured to be removably coupled to the fins K of the mounting key M. In some embodiments, the circuitry device 500 is activated by a wireless communication by an external device, voice, or motion, and the activated circuitry device 500 communicates one or more signals or information to the components attached thereto in order to lock or unlock the locking cap 400. With reference to FIG. 16 and the locking cap 200, in some embodiments, for example, the locking cap 400 comprises a corresponding solenoid 474 that causes rotation of the lock ring corresponding to lock ring 220, which causes the pin 260 to pass through the opening 213. In such embodiments, the pin 260 then enters the slot S of a fin K of the rear mounting key M. After the pin 260 is inserted into the slot S, the locking cap 200 cannot be rotatably withdrawn from the rear mounting key M.

The base cap, such as the base cap 210 in the locking cap 200 and the base cap 410 in the locking cap 400, have a height (i.e., distance between top and bottom surfaces) in the range of about 20 mm to about 80 mm, or about 30 mm to about 70 mm, or about 40 mm to about 60 mm, including, about 40 mm, 41 mm, 42 mm, 43 mm, 44 mm, 45 mm, 46 mm, 47 mm, 48 mm, 49 mm, 50 mm, 51 mm, 52 mm, 53 mm, 54 mm, 55 mm, 56 mm, 57 mm, 58 mm, 59 mm, etc. The exemplary ranges and values further include more specific values for each subrange and specific example, including, about 46.10 mm, 46.20 mm, 46.35 mm, 46.44 mm, 46.52 mm, 46.67 mm, 46.77 mm, etc.

In various embodiments, the base cap, such as the base cap 210 in the locking cap 200 and the base cap 410 in the locking cap 400, has a generally cylindrical shape. In such embodiments, the base cap has an external diameter in the range of about 65 mm to about 90 mm, or about 70 mm to about 80 mm, including about 71 mm, 72 mm, 73 mm, 74 mm, 75 mm, 76 mm, 77 mm, 78 mm, 79 mm. The exemplary ranges and values further include more specific values for each subrange and specific example, including, about 75.10 mm, 75.22 mm, 75.33 mm, 75.49 mm, 75.55 mm, 75.60 mm, 75.77 mm, 75.89 mm, 75.90 mm, etc.

In various embodiments, the base cap, such as the base cap 210 in the locking cap 200 and the base cap 410 in the locking cap 400, has a generally hollow, or tubular, cylindrical shape. In such embodiments, the base cap has an internal diameter in the range of about 35 mm to about 75 mm, or about 40 mm to about 65 mm, or about 55 mm to about 60 mm, including about 56 mm, 57 mm, 58 mm, 59 mm. The exemplary ranges and values further include more specific values for each subrange and specific example, including, about 55.10 mm, 55.22 mm, 55.33 mm, 55.49 mm, 55.55 mm, 55.60 mm, 55.77 mm, 55.80 mm, 55.97 mm, etc.

In various embodiments, the base cap, such as the base cap 210 in the locking cap 200 and the base cap 410 in the locking cap 400, has a generally hollow, or tubular, cylindrical shape with on open end and a closed end. In such embodiments, the base cap has an internal depth from the bottom surface of to the lower, internal surface of the crown (e.g., surface 109a in locking cap 100) in the range of about 20 mm to about 75 mm, or about 25 mm to about 55 mm, or about 25 mm to about 35 mm, including about 26 mm, 27 mm, 28 mm, 29 mm, 30 mm, 31 mm, 32 mm, 33 mm, 34 mm, etc. The exemplary ranges and values further include more specific values for each subrange and specific example, including, about 30.01 mm, 30.02 mm, 30.03 mm, 30.03 mm, 30.05 mm, 30.08 mm, 30.09 mm, 30.12 mm, 30.15 mm, etc.

In various embodiments, the locking ring, such as the locking ring 120 in the locking cap 100 or the locking ring 220 of the locking cap 200, has a generally cylindrical shape with a height (or thickness) in the range of about 2 mm to about 7 mm, or about 3 mm to about 5 mm, or about 3.5 mm to about 4.5 mm, including, about 3.6 mm, 3.7 mm, 3.8 mm, 3.9 mm, 4.0 mm, 4.1 mm, 4.2 mm, 4.3 mm, 4.4 mm, etc. The exemplary ranges and values further include more specific values for each subrange and specific example, including, 4.05 mm, 4.11 mm, 4.20 mm, 4.33 mm, 4.44 mm, etc.

In some embodiments, the locking ring has a height (or thickness) in the range of about 2.0 mm to about 4.5 mm, or about 2.5 mm to about 3.5 mm, including about 3.02 mm, 3.03 mm, 3.04 mm, 3.05 mm, 3.06 mm, 3.07 mm, 3.08 mm, 3.09 mm, 3.10 mm, 3.11 mm, 3.12 mm, 3.13 mm, 3.14 mm, 3.15 mm, etc.

In various embodiments, the spring ring, such as the spring ring 130 in the locking cap 100 or the spring ring 230 in the locking cap 200, has a generally cylindrical shape with a height in the range of about 1.0 mm to about 3.0 mm, including about 1.2 mm, 1.4 mm, 1.6 mm, 1.8 mm, 2.0 mm, 2.2 mm, 2.4 mm, 2.6 mm, etc., including further specific values such as 1.99 mm, 2.00 mm, 2.10 mm, 2.12 mm, 2.13 mm, 2.15 mm, etc.

In various embodiments, the shim ring, such as the shim ring 140 in the locking cap 100 or the shim ring 240 in the locking cap 200, has a generally cylindrical shape with a height in the range of about 1.0 mm to about 3.0 mm, including about 1.2 mm, 1.4 mm, 1.6 mm, 1.8 mm, 2.0 mm, 2.2 mm, 2.4 mm, 2.6 mm, etc., including further specific values such as 1.99 mm, 2.00 mm, 2.10 mm, 2.12 mm, 2.13 mm, 2.15 mm, etc.

In various embodiments, the top ring, such as the top ring 150 in the locking cap 100 or the top ring 250 in the locking cap 200, has a generally cylindrical shape with a height (or thickness) in the range of about 2 mm to about 10 mm, or about 3 mm to about 9 mm, or about 3.5 mm to about 8 mm, including, about 3.6 mm, 3.7 mm, 3.8 mm, 3.9 mm, 4.0 mm, 4.1 mm, 4.2 mm, 4.3 mm, 4.4 mm, etc. The exemplary ranges and values further include more specific values for each subrange and specific example, including, 4.05 mm, 4.11 mm, 4.20 mm, 4.33 mm, 4.44 mm, etc. In some embodiments, the top ring has a beveled structure from the exterior diameter to the interior diameter. In such embodiments, the interior diameter of the top ring may have a thickness in the range of about 3.5 mm to about 4.5 mm and the exterior diameter in the range of about 5.0 mm to about 7.5 mm.

The solenoid 274 in the locking cap 200 and the solenoid 474 in the locking cap 400 can be any suitable size. In some embodiments, the solenoid has a generally rectangular shape with a total height in the range of about 10 mm to 30 mm, including exemplary subranges and specific values, including 19 mm, 20 mm, 21 mm, 22 mm, and further specific values, such as, 20.5 mm, 20.6 mm, 20.7 mm, 20.8 mm, 20.9 mm, 21.0 mm, 21.1 mm, 21.2 mm, 21.3 mm, 21.4 mm, 21.5 mm, 21.6 mm, etc.; and a body height in the range of about 10 mm to 15 mm, including exemplary subranges and specific values, including 11 mm, 12 mm, 13 mm, 14 mm, 15 mm, and further specific values, such as, 13.73 mm, 13.83 mm, 13.90 mm, 14.00 mm, 14.11 mm, etc. The solenoid width may be in the range of about 7 mm to about 15 mm, or about 8 mm to about 13 mm, or about 9 mm to about 11 mm, including exemplary subranges and specific values, including 8.11 mm, 9.33 mm, 10.00 mm, 11.7 mm, etc.

The solenoid housing 272 in the locking cap 200 and the solenoid housing 472 in the locking cap 400 can be any suitable size, whereby the suitability is determined based on the size of the solenoid. In some embodiments, the housing has a generally rectangular shape with a height in the range of about 11 mm to 18 mm, or about 12 mm to about 16 mm, including exemplary subranges and specific values, including 11 mm, 12 mm, 13 mm, 14 mm, 15 mm, 16 mm, and further specific values, such as, 13.73 mm, 14.83 mm, 16.09 mm, 16.20 mm, 17.50 mm, 17.91 mm, etc.

The pin 273 of the solenoid 274 in the locking cap 200 and the pin 473 of the solenoid 474 in the locking cap 400 can be any suitable size. In some embodiments, the pin has a cylindrical shape with a diameter in the range of about 1 mm to about 4 mm, or about 2 mm to about 3.5 mm, or about 2.55 mm to about 3.25 mm, including, about 2.90 mm, 2.91 mm, 2.92 mm, 2.93 mm, 2.94 mm, 2.95 mm, 2.96 mm, 2.97 mm, 2.98 mm, 2.99 mm, 3.00 mm, 3.01 mm, 3.02 mm, etc. In some embodiments, the pin has a length in the range of about 2 mm to about 4.5 mm, or about 2.5 mm to about 3.5 mm, including about 3.02 mm, 3.03 mm, 3.04 mm, 3.05 mm, 3.06 mm, 3.07 mm, 3.08 mm, 3.09 mm, 3.10 mm, 3.11 mm, 3.12 mm, 3.13 mm, 3.14 mm, 3.15 mm, etc.

In various embodiments, the locking cap and its subcomponents, including the base cap, the locking ring, the spring ring, the shim ring, and the top ring, can be comprised of any suitable material. In this context, a suitable material includes polymers, metals and metal alloys, and other materials used in the manufacturing used in the field of security. In some embodiments, for example, the components of the locking cap may be comprised of polyoxymethylene (Delrin), Bakelite, acrylonitrile butadiene styrene (ABS), or any other moldable plastic. In some embodiments, for example, the components of the locking cap may be comprised of a carbon fiber composition. In some embodiments, for example, the components of the locking cap may be comprised of an extrudable or machine metal, including, for example, iron or non-iron (e.g., aluminum) metal or metal alloys.

Exemplary embodiments of the devices and methods are described above in detail. The devices and methods are not limited to the specific embodiments described herein, but rather, components of the device and/or steps of the method may be utilized independently and separately from other components and/or steps described herein. For example, the device may also be used in combination with other devices and methods, and is not limited to practice with only a device as described herein. Rather, the exemplary embodiment can be implemented and utilized in connection with many other devices.

Although specific features of the present embodiments may be shown in some drawings and not in others, this is for convenience only. In accordance with the principles of the disclosure, any feature of a drawing may be referenced and/or claimed in combination with any feature of any other drawing.

As used herein, the use of examples, or exemplary language (e.g., "such as"), is intended to illuminate the embodiments and does not pose a limitation on the scope of the claims unless otherwise stated. No language in the specification should be construed as indicating any non-claimed element as essential.

As used herein, the terms "about" and "substantially" will be understood by persons of ordinary skill in the art and will vary to some extent depending upon the context in which it is used. If there are uses of the term which are not clear to persons of ordinary skill in the art, given the context in which it is used, "about" and "substantially" will mean up to plus or minus 10% of the particular term.

The foregoing is provided for purposes of illustrating, explaining, and describing embodiments of this disclosure. Modifications and adaptations to these embodiments will be apparent to those skilled in the art and may be made without departing from the scope or spirit of this disclosure. Although specific features of the present embodiments may be shown in some drawings and not in others, this is for convenience only. In accordance with the principles of the disclosure, any feature of a drawing may be referenced and/or claimed in combination with any feature of any other drawing. Although the subject matter has been described in terms of exemplary embodiments, it is not limited thereto. Rather, the appended claims should be construed broadly, to include other variants and embodiments, which may be made by those skilled in the art.

I claim:

1. A locking cap for coupling to a rear mounting key of a camera lens, comprising:
    a base cap, a locking ring, a spring ring, and a top ring; wherein the locking ring is positioned between the base cap and the spring ring; and wherein the spring ring is positioned between the locking ring and the top ring;
    the base cap comprising a cylindrical sidewall, a flange coupled to a first end of the sidewall, and a closed crown coupled to a second end of the sidewall;
    wherein the flange comprises a first face comprising a rim and a tray, the tray projecting laterally outward form the first end of the sidewall to the rim, the rim projecting longitudinally upward from the tray, the tray having a depressed height relative to the rim; and a second face comprising a plurality of cogs configured to couple to the rear mounting key of the camera lens;
    wherein the flange and the top ring combine to enclose the locking ring and the spring ring;
    the locking ring comprising a post projecting longitudinally upward from a first face of the locking ring through a through-hole in the spring ring, a tab projecting laterally outward from a sidewall of the locking ring, and a locking mechanism comprising a pair of ramps separated by a through-hole and a pin having a head on the first face of the locking ring and a shaft extending through the through-hole of the locking mechanism into an opening on the tray of the flange, the opening configured to receive the pin;

wherein the flange further comprises a recess in the rim for the receiving the tab of the locking ring, the recess defined by a first endwall and a second endwall opposite the first endwall, wherein the tab of the locking ring rotatably slides laterally between the first and second endwalls, whereby the locking mechanism is activated when the tab is in contact with the first endwall and deactivated when the tab is in contact with the second endwall; and wherein the locking cap can be removed from the rear mounting key of the camera lens when the locking mechanism is deactivated.

2. The locking cap of claim 1, further comprising a shim ring positioned between the spring ring and the top ring, wherein the flange and the top ring combine to enclose the locking ring, the spring ring, and the shim ring.

3. The locking cap of claim 2, wherein the spring ring comprises a through-hole configured to receive the post projecting upward from the top surface of the locking ring, which aligns the locking ring and the spring ring with one another such that the locking ring and the spring ring will simultaneously rotate about the base cap.

4. The locking cap of claim 3, wherein the spring ring comprises a biasing member laterally positioned between an exterior diameter and an internal diameter of the spring ring, the biasing member comprising a first end that is connected to and a part of the spring ring, and a second end, opposite the first end, that is not connected to the spring ring.

5. The locking cap of claim 4, wherein the second end of the biasing member comprises a spring post projecting longitudinally upward toward and biased downward by the shim ring, wherein when the locking mechanism is activated, the spring post is forced downward and the biasing member is pressed against the pin in the locking mechanism, which causes a shaft of the pin to be inserted into the opening in the tray of the flange.

6. The locking cap of claim 1, wherein the pair of ramps are a stepped ramp and a beveled ramp, respectively, and wherein the stepped ramp and the beveled ramp are oriented and inclined in the same direction about the lateral and longitudinal axes.

7. The locking cap of claim 6, wherein the pin is inserted through the locking mechanism near a highest point of the inclined ramps when the lock is not activated, and wherein the pin is inserted through the locking mechanism near a lowest point of the inclined ramps when the lock is activated.

8. The locking cap of claim 1, wherein the respective cogs of the plurality of cogs are equally spaced apart from one another, and wherein the respective cogs and corresponding spaces therebetween are configured for coupling with the rear mounting key of the camera lens.

9. An automated locking cap for coupling to a rear mounting key of a camera lens, comprising:

a base cap, a locking ring, a spring ring, and a top ring;
wherein the locking ring is positioned between the base cap and the spring ring; and wherein the spring ring is positioned between the locking ring and the top ring;

the base cap comprising a cylindrical sidewall, a flange coupled to a first end of the sidewall, and a closed crown coupled to a second end of the sidewall;

wherein the flange comprises a first face comprising a rim and a tray, the tray projecting laterally outward form the first end of the sidewall to the rim, the rim projecting longitudinally upward from the tray, having a depressed height relative to the rim; and a second face comprising a plurality of cogs configured to couple to the rear mounting key of the camera lens;

wherein the flange and the top ring combine to enclose the locking ring and the spring ring;

the base cap further comprising a circuit board and an actuating device in communication with the circuit board, the circuit board being programmed to receive signals from a user and to transmit the signals to the actuating device, wherein the actuating device comprises a retractable pin that is insertable into and retractable from a through-hole in each of the top ring, the spring ring, and the locking ring upon receiving the respective signal from the user;

the locking ring comprising a post projecting longitudinally upward from a first face of the locking ring through a through-hole in the spring ring, a tab projecting laterally outward from a sidewall of the locking ring, and a locking mechanism comprising a pair of ramps separated by a through-hole and a pin having a head on the first face of the locking ring and a shaft extending through the through-hole of the locking mechanism into an opening on the tray of the flange, the opening configured to receive the pin;

wherein the flange further comprises a recess in the rim for the receiving the tab of the locking ring, the recess defined by a first endwall and a second endwall opposite the first endwall, wherein the tab of the locking ring rotatably slides laterally between the first and second endwalls, whereby the locking mechanism is activated when the tab is in contact with the first endwall and deactivated when the tab is in contact with the second endwall; and wherein the locking cap can be removed from the rear mounting key of the camera lens when the locking mechanism is deactivated.

10. The automated locking cap of claim 9, wherein the sidewall comprises an impression configured to receive the actuating device such that actuating device projects outward from the sidewall.

11. The automated locking cap of claim 9, wherein the actuating device comprises a solenoid and a housing configured to contain the solenoid, and wherein the housing is coupled to the sidewall and positioned to be in contact with an upper surface of the top ring.

12. The automated locking cap of claim 9, further comprising a shim ring positioned between the spring ring and the top ring, wherein the flange and the top ring combine to enclose the locking ring, the spring ring, and the shim ring.

13. The automated locking cap of claim 12, wherein the spring ring comprises a through-hole configured to receive the post projecting upward from the top surface of the locking ring, which aligns the locking ring and the spring ring with one another such that the locking ring and the spring ring will simultaneously rotate about the base cap.

14. The automated locking cap of claim 13, wherein the spring ring comprises a biasing member laterally positioned between an exterior diameter and an internal diameter of the spring ring, the biasing member comprising a first end that is connected to and a part of the spring ring, and a second end, opposite the first end, that is not connected to the spring ring.

15. The automated locking cap of claim 14, wherein the second end of the biasing member comprises a spring post projecting longitudinally upward toward and biased downward by the shim ring, wherein when the locking mechanism is activated, the spring post is forced downward and the biasing member is pressed against the pin in the locking mechanism, which causes a shaft of the pin to be inserted into the opening in the tray of the flange.

16. The automated locking cap of claim 9, wherein the pair of ramps are a stepped ramp and a beveled ramp, respectively, and wherein the stepped ramp and the beveled ramp are oriented and inclined in the same direction about the lateral and longitudinal axes.

17. The automated locking cap of claim 16, wherein the pin is inserted through the locking mechanism near a highest point of the inclined ramps when the lock is not activated, and wherein the pin is inserted through the locking mechanism near a lowest point of the inclined ramps when the lock is activated.

18. The automated locking cap of claim 9, wherein the respective cogs of the plurality of cogs are equally spaced apart from one another, and wherein the respective cogs and corresponding spaces therebetween are configured for coupling with the rear mounting key of the camera lens.

19. The automated locking cap of claim 9, further comprising a battery charger in communication with the circuit board, wherein a first end of the battery charger is accessible to a user via an external surface of the sidewall and a second end of the battery is connected to the circuit board.

20. The automated locking cap of claim 9, wherein the circuit board comprises one or more wireless communication devices, a microphone, and a light.

\* \* \* \* \*